United States Patent
Kawai et al.

(10) Patent No.: US 7,128,038 B2
(45) Date of Patent: Oct. 31, 2006

(54) INTAKE DEVICE FOR AN INTERNAL COMBUSTION ENGINE

(75) Inventors: Shinji Kawai, Aichi-ken (JP); Hisashi Kino, Aichi-ken (JP); Tomiharu Isogai, Aichi (JP); Hitoshi Takeuchi, Aichi (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/681,378

(22) Filed: Oct. 9, 2003

(65) Prior Publication Data

US 2004/0123835 A1 Jul. 1, 2004

(30) Foreign Application Priority Data

Oct. 9, 2002 (JP) ............................. 2002-296629

(51) Int. Cl.
*F02D 9/02* (2006.01)

(52) U.S. Cl. .................... 123/184.21; 285/24

(58) Field of Classification Search ................ 123/184.21–184.61, 337; 285/24, 285; 277/602–603
See application file for complete search history.

(56) References Cited

U.S. PATENT DOCUMENTS

| | | | | |
|---|---|---|---|---|
| 1,474,375 A | * | 11/1923 | Moore .................... | 285/350 |
| 3,059,941 A | * | 10/1962 | Kaynor et al. ........... | 277/603 |
| 3,510,139 A | * | 5/1970 | Potter ..................... | 277/603 |
| 3,773,360 A | * | 11/1973 | Timbers .................. | 285/307 |
| 3,784,235 A | * | 1/1974 | Kessler et al. ........... | 285/94 |
| 4,583,772 A | * | 4/1986 | Vassallo et al. .......... | 285/347 |
| 4,603,886 A | * | 8/1986 | Pallini et al. ............. | 285/24 |
| 4,779,902 A | * | 10/1988 | Lee ......................... | 285/260 |
| 4,804,208 A | * | 2/1989 | Dye ......................... | 285/26 |
| 5,186,126 A | * | 2/1993 | Tarekado et al. ........ | 123/184.44 |
| 5,219,185 A | * | 6/1993 | Oddenino ................ | 285/26 |
| 5,341,773 A | * | 8/1994 | Schulte et al. .......... | 123/184.61 |
| 5,501,075 A | | 3/1996 | Spies et al. | |
| 5,664,533 A | | 9/1997 | Nakayama et al. | |
| 5,845,944 A | * | 12/1998 | Enger et al. ............ | 285/23 |
| 5,878,715 A | * | 3/1999 | Hernandez et al. ...... | 123/337 |

(Continued)

FOREIGN PATENT DOCUMENTS

JP 10259768 9/1998

(Continued)

*Primary Examiner*—Marguerite McMahon
(74) *Attorney, Agent, or Firm*—Dennison, Schultz & MacDonald

(57) ABSTRACT

An intake device for an internal combustion engine includes a throttle body (1) that forms an intake passage (1*a*). A throttle valve (2) is arranged within the intake passage. A pipe member (26) is connected to the throttle body, wherein the pipe member forms a communication passage (26*a*) communicating with the intake passage. An engagement device (53,63; 85,87; 92,63) is provided between the throttle body and the pipe member. The engagement device includes at least one engagement protrusion (53; 85; 92) and at least one engagement recess (63; 87M). When the engagement protrusion and the engagement recess are engaged with each other, detachment of the throttle body and the pipe member from each other is restricted. The assembly process is simplified by a lack of separate components such as clamps and bolts, relying instead upon a typical snap-fit connection.

8 Claims, 22 Drawing Sheets

U.S. PATENT DOCUMENTS

| | | | |
|---|---|---|---|
| 5,921,591 A | * | 7/1999 | Argent ....................... 285/330 |
| 5,967,116 A | | 10/1999 | Kawashima et al. |
| 5,988,131 A | * | 11/1999 | Hernandez et al. .... 123/184.21 |
| 6,231,084 B1 | * | 5/2001 | Hester et al. ................. 285/23 |
| 6,748,915 B1 | * | 6/2004 | Cole et al. ............. 123/184.53 |
| 2002/0056478 A1 | | 5/2002 | Scholten et al. |
| 2002/0163194 A1 | * | 11/2002 | Mintz et al. ................ 285/361 |

FOREIGN PATENT DOCUMENTS

| JP | 1122569 | 1/1999 |
|---|---|---|

* cited by examiner

INTAKE DEVICE FOR AN INTERNAL COMBUSTION ENGINE

This application claims priority to Japanese patent application serial number 2002-296629, the contents of which are incorporated herein by reference.

BACKGROUND OF THE INVENTION

The present invention relates to an intake device for supplying intake air to an internal combustion engine, such as an automotive engine.

Generally speaking, an intake device for an internal combustion engine has a throttle body equipped with a throttle valve for incrementally opening and closing an intake passage, and a pipe member connected to the throttle body. The pipe member forms a communication passage communicating with the intake passage of the throttle body.

Japanese Laid-Open Patent Publication No. 11-22569 discloses a construction in which the throttle body and the pipe member are fixed together by screw means, such as bolts (See the description on page 3 and FIG. 2).

Further, Japanese Laid-Open Patent Publication No. 10-259768 discloses a construction in which the throttle body and the pipe member are connected together by clamping means, including clamp members (See the description on pages 4 and 5 and FIG. 1).

The constructions disclosed in both of the above-mentioned publications require separate components, such as bolts or clamp members. The result is that the connection structure for the throttle body and the pipe member is relatively complex; causing the intake device for an internal combustion engine has to be relatively large.

SUMMARY OF THE INVENTION

It is accordingly an object of the present invention to provide an intake device for an internal combustion engine that allows simplification of the connection structure for the throttle body and the pipe member, allowing a reduction in the size of the intake device.

According to the present invention, an intake device for an internal combustion engine has a throttle body in which an intake passage is formed, and a throttle valve arranged within the intake passage. A pipe member is connected to the throttle body. The pipe member comprises, for example, an intake manifold in which there is formed a communication passage communicating with the intake passage. An engagement device is provided between the throttle body and the pipe member. The engagement device may have at least one engagement protrusion and at least one engagement recess. Detachment of the throttle body and the pipe member from each other may be prevented when the engagement protrusion and the engagement recess are engaged with each other.

That is, according to the present invention, secure attachment may be achieved through engagement of the engagement protrusion and the engagement recess allowing the connection structure to be simplified, and causing a reduction in the overall size of the intake device.

It is desirable for the engagement device to be designed such that the engagement protrusion and the engagement recess are automatically engaged with each other through relative movement. The relative movement should be in a given direction of the throttle body and the pipe member, for example, through the movement of fitting together the throttle body and the pipe member. Due to this type of construction, the connecting operation can be facilitated without requiring separate components or tools.

The throttle body and the pipe member respectively may have a first connection end portion and a second connection end portion. It is preferred that the first and second connection end portions to be fitted with each other in the axial direction.

It is desirable for the engagement protrusion and the engagement recess to be correspondingly formed on one and the other of the first connection end portion and the second connection end portion. With this construction, there is no need to provide a separate member for securing the connection, thereby achieving a further simplification in the intake device structure.

In this case, it will be advantageous if the engagement protrusion is formed integrally with one of the first and second connection end portions and protrudes radially. Therefore, the engagement recess may be, for example but not limited to, a groove formed on the other of the first and second connection end portions. Many structures can function as the engagement recess as long as the feature is capable of resisting unintentional disengagement of the engagement protrusion in the axial and/or circumferential directions.

Further, it is desirable for the first connection end portion and/or the second connection end portion to have a resiliently deformable portion, with the engagement protrusion or the engagement recess being provided on the resiliently deformable portion. The engagement protrusion and the engagement recess may be engaged with each other in a snap-fit manner utilizing the resilient deformation and the restoration to some degree of the resiliently deformable portion. With this construction, the throttle body and the pipe member can be connected to each other through a one-step, simple operation.

In another aspect of the invention, the engagement recess may be provided in a substantially hook-shaped engagement member integrally formed with the other of the first and second connection end portions. The engagement recess may be open on one side in a circumferential direction about the axis of the throttle body, and the engagement protrusion may be received from the open side, thereby locking the engagement protrusion in both the circumferential and the axial directions.

In still another aspect of the invention, the engagement device may further include a snap member to be fit-engaged with one of the first connection end portion or the second connection end portion. The engagement protrusion may be provided on the snap member, and the engagement recess provided in the other of the first or second connection end portion.

In this case, the snap member preferably has a substantially ring-shaped configuration, and the engagement protrusion is formed integrally with the snap member and radially protrudes from the snap member. The engagement protrusion is capable of resilient deformation and is adapted to be snap-fit engaged with the engagement recess by utilizing the resilient deformation and the restoration to some degree of the engagement protrusion.

Additionally, it is desirable for the snap member to have an integral pressurizing portion pressurizing the first connection end portion and the second connection end portion axially in a detachment direction opposed to each other. Provision of this pressurizing portion enables the snap ring to prevent or mitigate rattle in the region where the engagement protrusion and the engagement recess are engaged with each other as well as various other points of contact along the throttle body and pipe interface.

It is also desirable for the intake device to further include a resilient seal member for effecting radial sealing between the first connection end portion and the second connection end portion. This construction may allow for reliable sealing within the connection region. It is desirable for this resilient seal member to be one or a plurality of O-rings or modified rings. It is preferred that the modified ring has an integral pressurizing portion urging the throttle body and the pipe member axially in a detachment direction opposed to each other. Pressurizing in this case referring to the ability to exert a force on the throttle body and pipe member, not necessarily referring to the physical or cellular structure of the resilient seal member.

Further, instead of incorporating the pressurizing portion into the snap member or the modified ring, it is also possible to provide a separate biasing device for urging the throttle body and the pipe member in detachment directions opposite to each other. For example, the biasing device may consist of a separate resilient ring such as an O-ring.

Further, it is advantageous for the intake device to be designed such that one of the first connection end portion or the second connection end potion has a reception groove capable of receiving the other of the first or the second connection end portions. With this construction, the first and second connection end portions are connected in a typical "spigot joint" relationship. The advantage of the spigot joint connection is that even if a moment orthogonal to the axis of the intake passage and pipe cavity is applied to the connection end portions, it is possible to prevent or mitigate the transfer of a load to the region where the engagement protrusion and the engagement recess are engaged with each other.

It is additionally desirable for the intake device to have a rotation prevention device for preventing relative rotation about and axis between the throttle body and pipe member, for example, between the first and second connection end portions. Due to this construction, even if a moment in the circumferential direction about the axis of the intake passage is applied to the throttle body and the pipe member, it is possible to reduce or mitigate the transfer of a load to the region where the engagement protrusion and the engagement recess are engaged with each other.

This rotation preventive device can be formed by a rotation preventive protrusion and a rotation preventive recess respectively formed on one and the other of the first connection end portion and the second connection end portion. In particular, it is desirable for the rotation preventive protrusion and the rotation preventive recess to be engaged with each other prior to or simultaneously with the engagement of the engagement protrusion and the engagement recess of the engagement device.

Additionally, it is desirable for the first connection end portion and the second connection end portion to be connected together in a close-fit state; this helps reduce or mitigate rattling between the throttle body and the pipe member. This close-fit state can be achieved, for example, by appropriately setting small tolerances for the diameters of the radially opposing surfaces of the first connection end portion and the second connection end portion, or by providing on one of the first connection end portion or the second connection end portion a protrusion that is physically crushed and/or deformed by the wall surface of the other of the first connection end portion or the second connection end portion during the fit-engagement of the two end portions.

BRIEF DESCRIPTION OF THE DRAWINGS

Additional objects, features and advantages of the present invention will be readily understood after reading the following detailed description together with the claims and the accompanying drawings, in which:

DESCRIPTION OF THE PREFERRED EMBODIMENTS

Here, first to fifth embodiments of the present invention will be described with reference to the drawings.

[First Embodiment]

An intake device for an internal combustion engine according to a first embodiment of the present invention will be described with reference to FIGS. 1 to 9. The intake device of this embodiment includes a throttle control device TC. First, a brief overall description of the device TC will be made. The throttle control device of this embodiment is formed as an electronic-control type throttle control device for controlling the throttle valve opening in response to signals from an engine control unit (ECU) of an automobile (not shown), including, but not limited to signals such as an acceleration signal related to an accelerator pedal depression amount, a traction control signal, a constant-speed traveling signal such as from a cruise control device, and an idling speed control signal.

Figure 1:
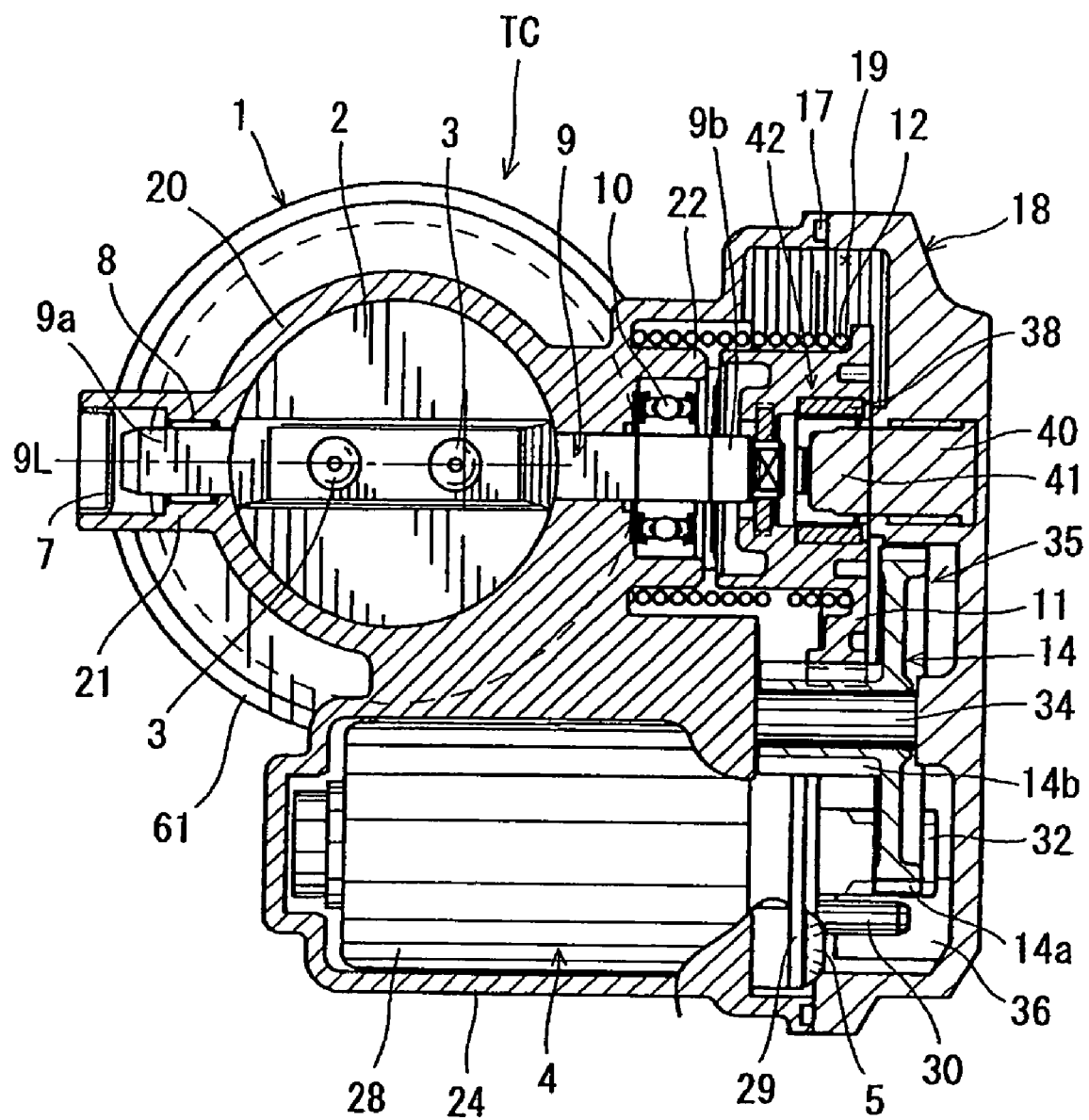
FIG. 1 is a cross-sectional view showing an intake device for an internal combustion engine according to a first embodiment of the present invention.
Figure 2:
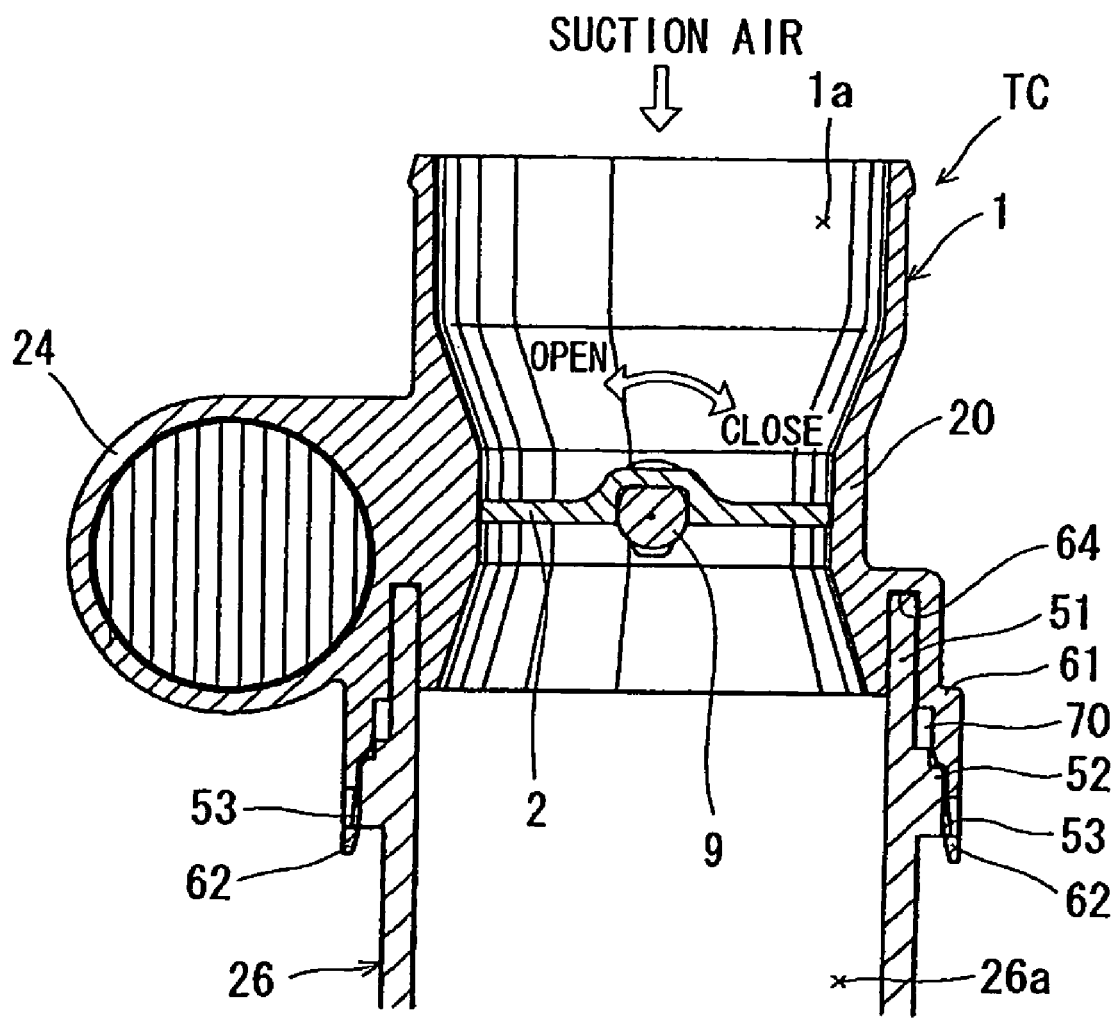
FIG. 2 is a longitudinal sectional view of a right-hand side portion of the intake device for an internal combustion engine of FIG. 1.

Referring to FIG. 1, the throttle control device TC of this embodiment includes a throttle body 1. The throttle body 1 is equipped with a main body portion 20 and a motor housing portion 24, which may be formed as an integral unit using resin. As shown in FIG. 2, formed in the main body portion 20 is a substantially cylindrical intake passage 1a extending vertically as viewed in the FIG. 2. Further, in FIG. 2, an air cleaner (not shown) is connected to an upper portion of the main body portion 20, and an intake manifold 26 is connected to a lower portion thereof.

Note that the intake manifold is formed of a resin, like the throttle body 1. Only a portion of an upper stream side of the intake manifold 26 is shown in FIG. 2, and a portion of the downstream side not shown is connected to an internal combustion engine (also not shown).

In the main body portion 20, there is mounted a metal throttle shaft 9 radially extending across the intake passage 1a (See FIG. 1). As shown in FIG. 1, bearing portions 21 and 22 through the intermediation of bearings 8 and 10 rotatably supports end portions 9a and 9b, respectively, of the throttle shaft 9. A throttle valve 2, made of resin for example, is fixed to the throttle shaft 9, possibly by means of a plurality of rivets 3 as shown. The throttle valve 2, which is situated inside the intake passage 1a, rotates so as to close the intake passage 1a as the throttle shaft 9 rotates in one direction, and rotates so as to open the intake passage 1a as the throttle shaft 9 rotates in the other direction. These incremental opening and closing movements of the throttle valve 2 controls the amount of intake air flowing through the intake passage 1a. In FIG. 2, the throttle valve 2 is in a fully closed position. When the throttle valve in the fully closed position is rotated counterclockwise, as viewed in FIG. 2, the intake passage (1a) is opened.

A plug 7 for confining the end portion 9a within the main body portion 20 is fitted into the bearing portion 21. Bearing portion 21 supports one end portion 9a (the left-hand end as seen in FIG. 1) of the throttle shaft 9. The other end portion 9b (the right-hand end as seen in FIG. 1) of the throttle shaft 9 extends through the bearing portion 22 and protrudes further to the right. A throttle gear 11 consisting of a sector gear is fixed to the protruding end of this end portion 9b so as not to allow relative rotation. A spring force, such as a torsion coil spring 12, is provided between the outer peripheral portion of the bearing portion 22 of the throttle body 1 and the outer peripheral portion of the throttle gear 11. This torsion coil spring 12 always urges the throttle valve 2 so as to close it through the throttle gear 11 and the throttle shaft 9. Further, although not shown, provided between the throttle body 1 and the throttle gear 11 is a stopper for preventing the throttle valve 2 from rotating in the closing direction beyond the fully closed position.

As shown in FIG. 1, the motor housing portion 24 of the throttle body 1 is formed in a cylindrical configuration having an axis substantially parallel with an axis 9L of the throttle shaft 9. One axial end (the left-hand end as seen in the drawing) of the motor housing 24 is closed. The interior of the motor housing portion 24 defines a space 24a open on the right-hand side of the throttle body 1. The space 24a accommodates a motor 4 that may be, for example, a DC motor. In the accommodation state as shown, the axis of the motor 4 extends parallel to the axis 9L of the throttle shaft 9. An output shaft 4a (See FIG. 3) of the motor 4 is positioned to the right, as seen in FIG. 1. The motor 4 has a motor casing 28 that defines an outer surface of the motor 4. Provided on the right-hand side of the motor casing 28 is a mounting flange 29, which is fastened to the motor housing portion 24, preferably by means of a plurality of screws 5 (See FIG. 3).

Figure 3:
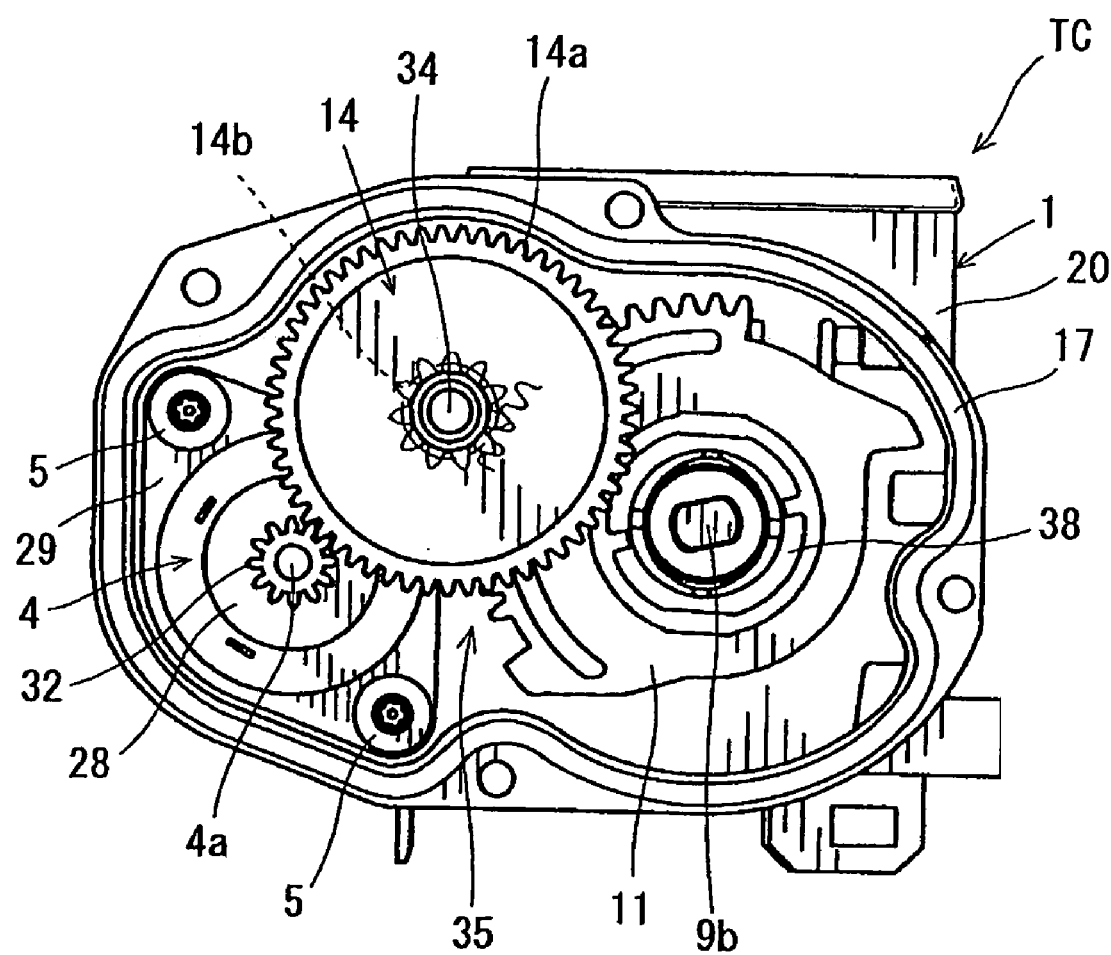
FIG. 3 is a right-hand side view of the intake device, with its cover removed therefrom.

The output shaft 4a of the motor 4 protrudes to the right as seen in FIG. 1 beyond the mounting flange 29, and a motor pinion 32 is fastened to this protruding portion (See FIG. 3). Further, as shown in FIG. 1, a counter shaft 34 is mounted to the throttle body 1 at a position between the main body portion 20 and the motor housing portion 24. The counter shaft 34 extends parallel to the axis 9L of the throttle shaft 9. A counter gear 14 is rotatably mounted to the counter shaft 34. The counter gear 14 has two gear portions 14a and 14b having different gear diameters. The large diameter gear portion 14a is in mesh with the motor pinion 32, and the small diameter gear portion 14b is in mesh with the throttle gear 11 (See FIG. 1). The motor pinion 32, the counter gear 14, and the throttle gear 11 constitute a speed reduction gear mechanism 35.

As shown in FIG. 1, a cover 18 mainly covering the speed reduction gear mechanism 35 is connected to the right-hand side surface of the throttle body 1 by a coupling means (not shown), for example, a coupling means may include a snap-fitting means, screw means, or clamp means, among others. Between the right-hand side surface of the throttle body 1 and the cover 18, there is provided an O-ring 17 to maintain these components in a sealed state. The throttle body 1 and the cover 18 form a gear accommodating chamber 19, accommodating the gear mechanism 35 within the gear accommodating chamber 19. Further, the motor 4 has a motor terminal 30 protruding from the mounting flange 29, and this motor terminal 30 is electrically connected to a battery (not shown) and, further, to the ECU by way of a relay terminal (not shown) of a relay connector 36 provided in the cover 18. Thus, the motor 4 is driven in accordance with an acceleration signal as described at the beginning of the description. The driving force of the motor 4 is transmitted to the throttle shaft 9 through the speed reduction gear mechanism 35, that is, through the motor pinion 32, the counter gear 14, and the throttle gear 11.

A ring-shaped magnet 38 is provided on the right-hand side surface of the throttle gear 11. This magnet 38 has a pair of semi-arcuate magnet segments exhibiting different polarities. Inside the cover 18, there is mounted a circuit board 40 opposed to the end surface of the throttle shaft 9. Mounted on the circuit board 40 is a Hall effect element 41 situated inside the magnet 38. When the throttle gear 11 rotates with the throttle shaft 9, the Hall element 41 detects a change in the magnetic field due to the magnet 38, and generates a Hall voltage. The Hall voltage generated by the Hall element 41 is input to the ECU by way of the circuit board 40 and the connector (not shown) provided in the cover 18. The ECU determines the throttle opening according to the change in the magnetic field of the magnet 38 as a magnetic physical quantity, and performs various control operations, such as fuel injection control, correction control on the opening of the throttle valve 2, and gear change control for automatic transmission, according to the vehicle speed detected by a vehicle speed sensor (not shown), etc. The magnet 38, the circuit board 40, and the Hall element 41 constitute a throttle sensor 42.

In the above-described throttle control device, when the engine is started, drive control is performed on the motor 4 based on a signal from the ECU, whereby, as described above, the throttle valve 2 is opened or closed through the speed reduction gear mechanism 35, with the result that the amount of intake air flowing through the intake passage 1a of the throttle body 1 is controlled.

Subsequently, a connection structure for the throttle body 1 and the intake manifold 26 will be described in detail.

Figure 5:
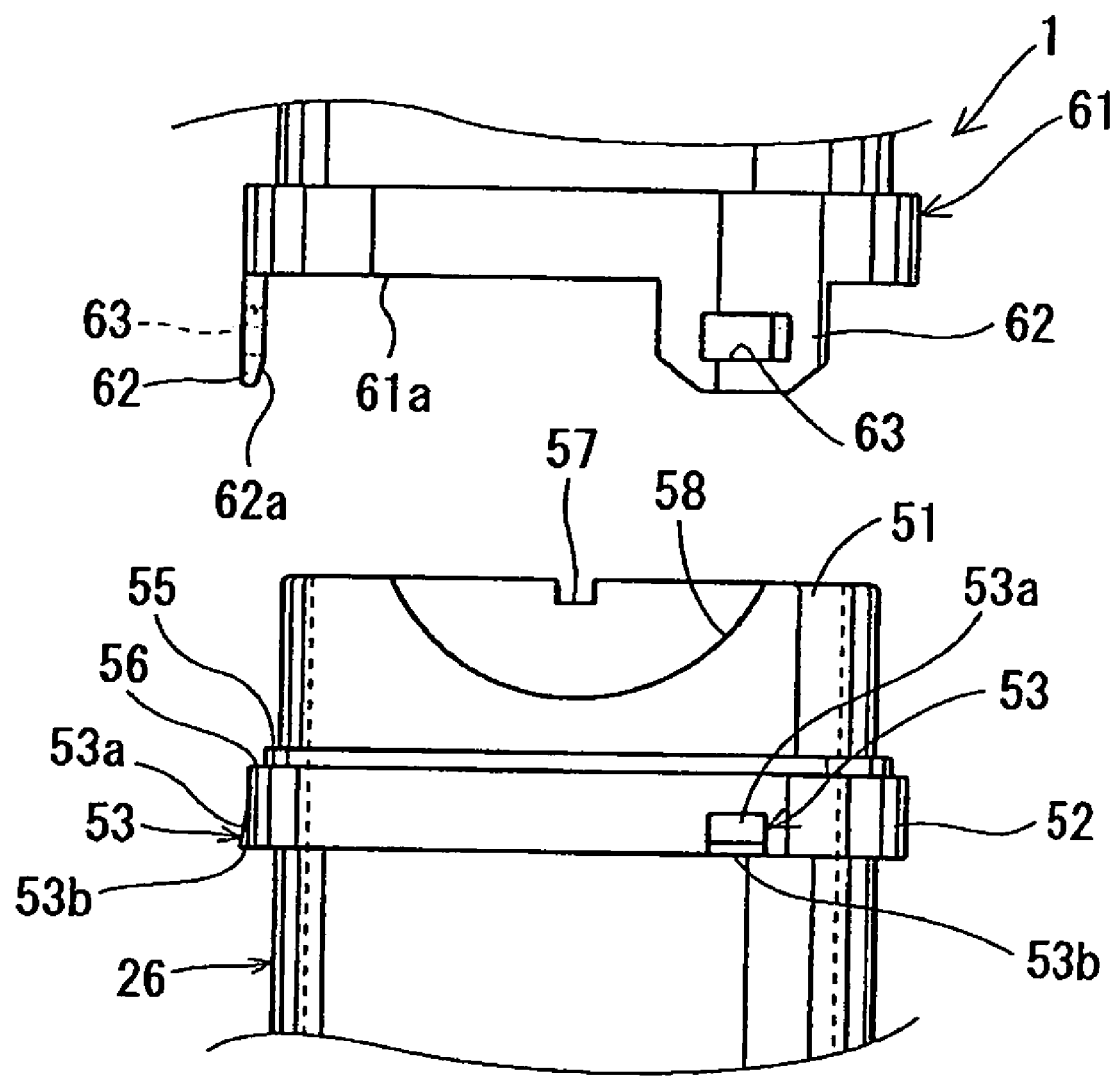
FIG. 5 is a right-hand side view showing a connection structure for a throttle body of the intake device and an intake manifold.

In FIG. 2, an upstream side connection end portion 51 of the intake manifold 26 is formed substantially as a cylinder. An annular enlarged portion 52 is integrally formed on the outer peripheral surface of the connection end portion 51. This enlarged portion 52 has a vertically elongated rectangular sectional configuration whose long side extends in the axial direction (the vertical direction in FIG. 2) of the intake manifold 26. As shown in FIG. 5, upper and lower step surfaces 55 and 56 are formed at the forward end (the upper end in FIG. 5) of the enlarged portion 52, on the side where the intake manifold 26 is inserted into the throttle body 1.

As shown in FIG. 5, on the outer peripheral surface of the enlarged portion 52, three engagement protrusions 53 (only two of which can be seen in FIG. 5) are formed integrally therewith at regular circumferential intervals. Each engagement protrusion 53 has a substantially rectangular configuration, and includes a guide slope 53a, whose protruding amount gradually increases axially downwards from above, and a lock surface 53b, with a lower surface not extending below the lower surface of the enlarged portion 52 (See FIG. 6).

As shown in FIG. 5, the forward end surface (the upper end surface in FIG. 5) of the connection end portion 51 contains a first rotation preventive recess 57 and a second rotation preventive recess 58, usually formed at positions diametrically opposed to each other. The first rotation preventive recess 57 is situated on the left-hand side (below the plane of FIG. 5) of the connection end portion 51 and has a substantially rectangular configuration open on the upper side. The second rotation preventive recess 58 is situated on the right-hand side (above the plane of FIG. 5) of the connection end portion 51 and has a substantially semi-circular configuration open on the upper side.

Figure 6:
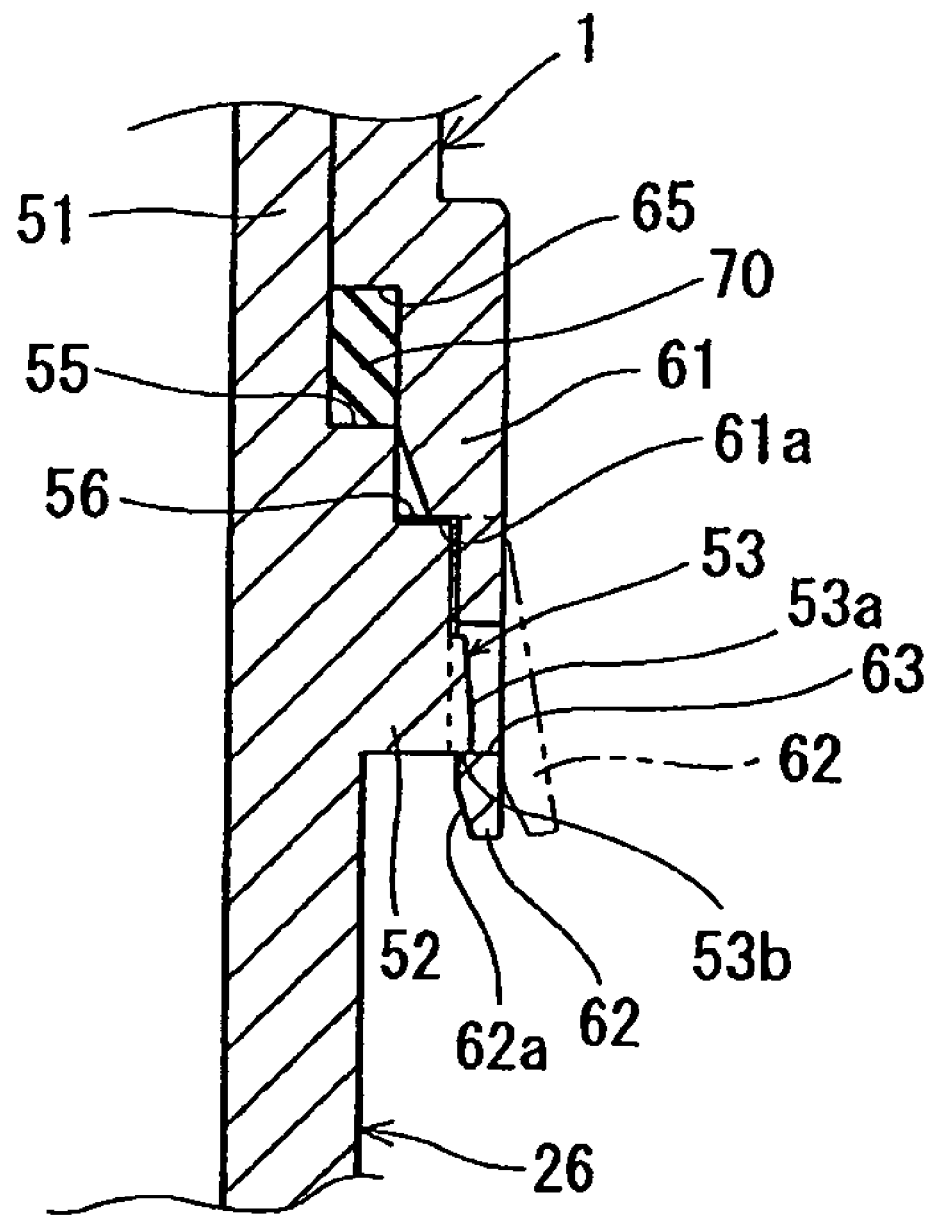
FIG. 6 is a partial sectional view of a portion around a snap-fit device of a connection portion.

Referring again to FIG. 2, a substantially cylindrical connection end portion 61 capable of receiving the connection end portion 51 of the intake manifold 26 is formed integrally at the downstream end (the lower end as viewed in FIG. 2) of the throttle body 1. As shown in FIG. 6, a forward end surface 61a (the lower end surface in FIG. 6) of the connection end portion 61 is formed so as to be capable of abutting or approaching the lower step surface 56 of the enlarged portion 52. Further, a plurality of engagement members 62 formed integrally with the connection end portion 61 protrude below the forward end surface 61a, and the engagement members 62 are capable of abutting or approaching the outer peripheral surface of the enlarged portion 52 of the intake manifold 26. Further, in the inner peripheral surface of the connection end portion 61, there is formed a step surface 65 opposed to the upper step surface 55 of the enlarged portion 52 with a space existing therebetween.

The number of engagement members 62 corresponds to the number of engagement protrusions 53 of the intake manifold 26 (i.e., there are three of each type in this embodiment, of which two can be seen in FIG. 5). The circumferential locations of engagement members 62 are in a positional relationship corresponding to the locations of engagement protrusions 53 (See FIGS. 4 and 5). The engagement members 62 are capable of resilient deformation, in particular, outward deflection (as indicated by the two-dot chain lines in FIG. 6).

Each engagement member 62 has a substantially rectangular engagement hole 63 allowing engagement with the corresponding engagement protrusion 53 (See FIG. 5). Further, on the inner side surface of the forward end portion (the lower end portion) of each engagement member 62, there is formed a guide slope 62a capable of coming into sliding contact with the guide slope 53a of the corresponding engagement protrusion 53 (See FIGS. 5 and 6).

Figure 4:
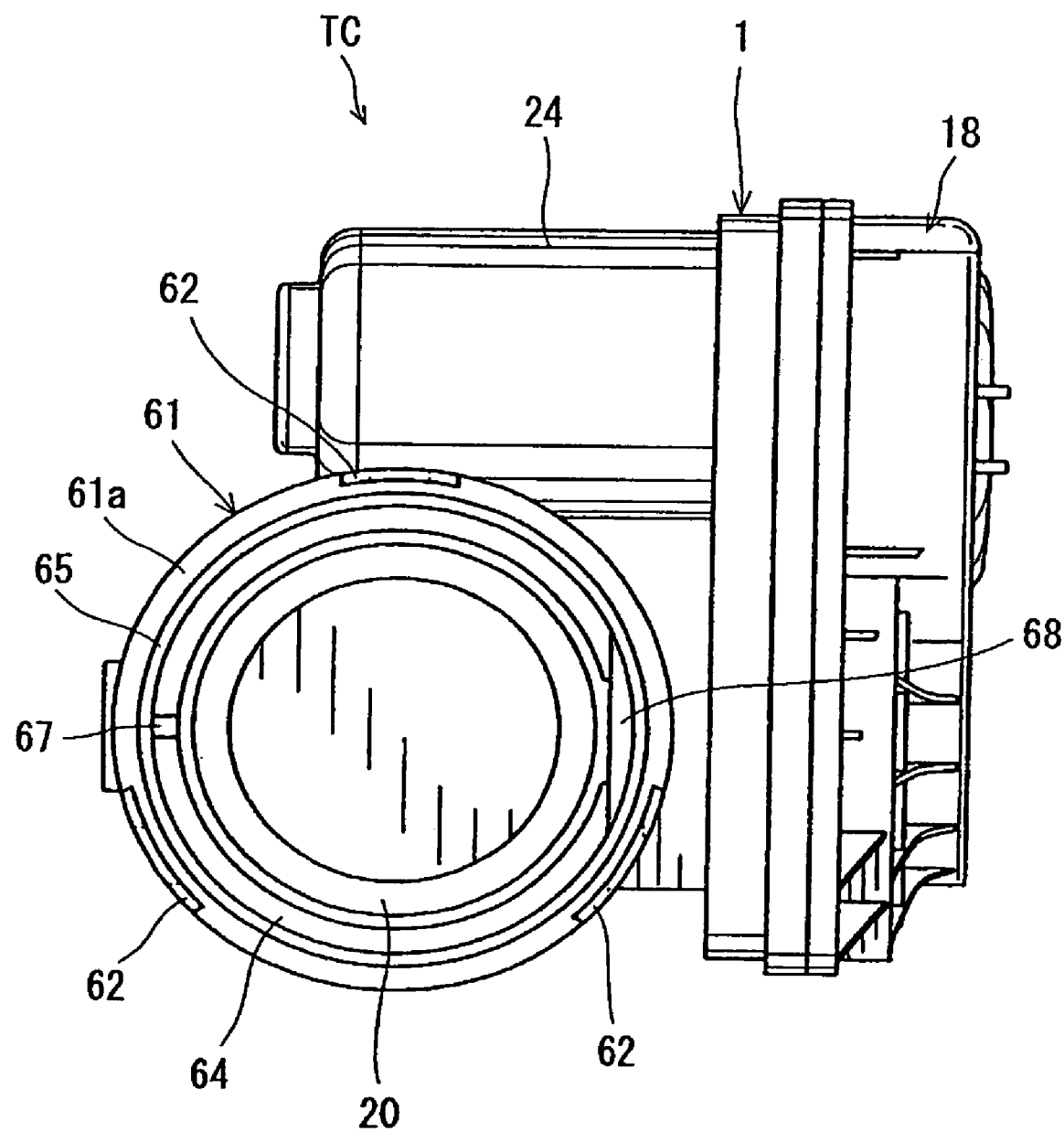
FIG. 4 is a bottom view of the intake device.

As shown in FIGS. 2 and 4, inside the connection end portion 61 of the throttle body 1, there is formed an annular reception groove 64 capable of receiving the connection end portion 51 of the intake manifold 26. The reception groove 64 is engaged with the connection end portion 51 so as to leave substantially no clearance therebetween. As shown in FIG. 4, a first rotation preventive protrusion 67 and a second rotation preventive protrusion 68, situated so as to be diametrically opposed to each other, protrude downward from the highest inner depth end surface of the reception groove 64. The first rotation preventive protrusion 67 is capable of being engaged with the first rotation preventive recess 57 (see FIG. 5). The second rotation preventive protrusion 68 is capable of being engaged with the second rotation preventive recess 58 (see FIG. 5). The second rotation preventive protrusion 68 utilizes a protruding portion extending downward into the reception groove 64 as a result of the formation of the bearing portion 22 (See FIG. 1 for the location of bearing portion 22).

Next, an operational description regarding the connection between the throttle body 1 and the intake manifold 26 will be given. First, from the positions shown in FIG. 5, the connection end portion 51 of the intake manifold 26 is inserted into the connection end portion 61 of the throttle body 1, whereby the connection end portion 51 is received into the reception groove (See FIG. 2). Relatively simultaneously, the guide slopes 53a of the engagement protrusions 53 abut the guide slopes 62a of the corresponding engagement members 62. The guide slopes 53a and the guide slopes 62a are then brought into sliding contact with each other. The engagement members 62 are outwardly deflected and deformed (See the two-dot chain line 62 in FIG. 6), and when the engagement protrusions 53 and the corresponding engagement holes 63 are eventually matched with each other in position, the engagement members 62 are resiliently restored radially inward in an attempt to approximate their original configuration (See the solid line 62 in FIG. 6). The restorative action results in the engagement protrusions 53 engaging with the corresponding engagement holes 63. In this way, the connection between the throttle body 1 and the intake manifold 26 is completed (See FIG. 2).

After attaining a state in which the throttle body 1 and the intake manifold 26 are connected to each other, if a force is applied in a detachment direction (upward for the throttle body 1 and/or downward for the intake manifold 26 in FIG. 2), the lock surfaces 53b of the engagement protrusions 53 are held in contact with an inner surface of the engagement holes 63 of the corresponding engagement members 62. The detachment of the throttle body 1 and the intake manifold 26 with respect to the axial direction is thereby resisted. The engagement protrusions 53 and the engagement members 62 constitute a typical "snap-fit device." By utilizing the resilient deformation of the engagement members 62, the engagement members 62 are engaged with the corresponding engaging protrusions 53.

Simultaneously with the completion of the connection between the throttle body 1 and the intake manifold 26, the rotation preventive protrusions 67 and 68 (See FIG. 4) are respectively engaged with the rotation preventive recesses 57 and 58 (See FIG. 5), whereby the throttle body 1 and the intake manifold 26 are prevented from rotation, with respect to each other, about the intake passage axis. The numbers and configurations of the rotation preventive devices can be modified as desired.

Figure 7:
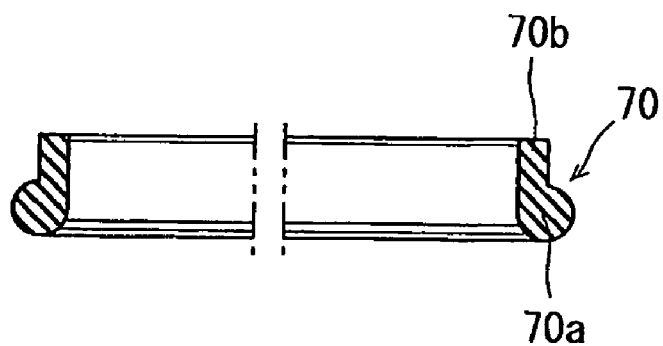
FIG. 7 is a sectional view of a modified O-ring of the connection portion.
Figure 8:
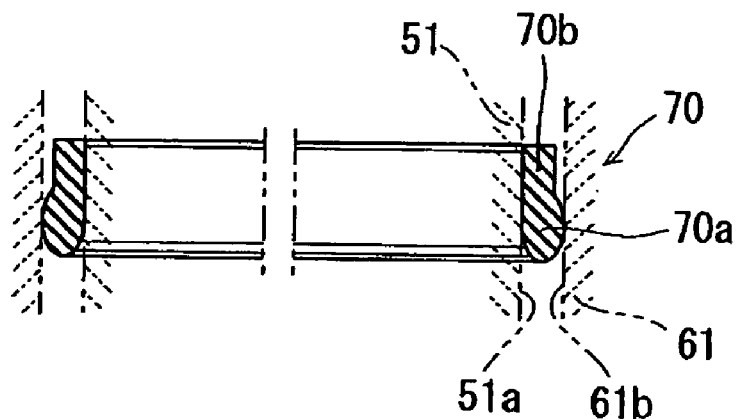
FIG. 8 is a sectional view of the modified O-ring in a radially compressed state.
Figure 9:
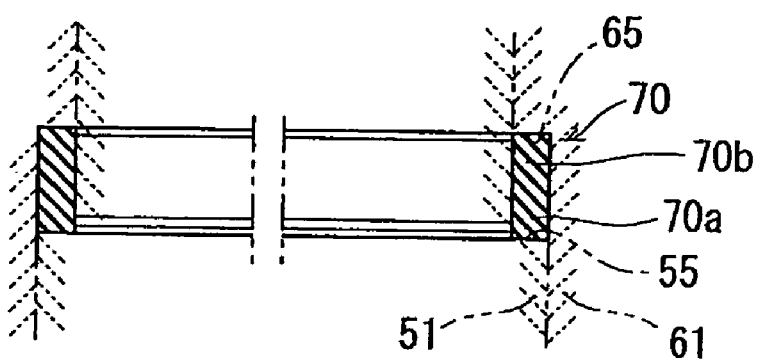
FIG. 9 is a sectional view of the modified O-ring in both a radially and an axially compressed state.

In the connected state as shown in FIG. 6, an annular space is defined between the step surface 65 of the connection end portion 61 and the upper step surface 55 of the connection end portion 51. A resilient modified O-ring 70 formed of rubber can be placed in this annular space. As shown in FIG. 7, under a no-load condition, the modified O-ring 70 exhibits a sealing portion 70a with a substantially circular sectional configuration and a pressurizing portion 70b with a substantially rectangular sectional configuration. The pressurizing portion 70b protrudes axially (upwards in FIG. 7) tangent to an inner circumference of the sealing portion 70a. In the attached state shown in FIG. 6, the sealing portion 70a of the modified O-ring 70 is radially compressed and deformed between diametrically opposed wall surfaces 51a and 61b (See FIG. 8) of the respective connection end portions 51 and 61. The pressurizing portion 70b (See FIG. 8) of the modified O-ring 70 is axially compressed and deformed (See FIG. 9) by axially opposed step surfaces 55 and 65 (See FIG. 6). From the time the intake manifold 26 is inserted into the throttle body 1 until the completion of the connection, the sealing portion 70a of the modified O-ring 70 undergoes radial compression and deformation. At the same time, the pressurizing portion 70b undergoes axial compression and deformation. Eventually, the modified O-ring 70 attains a state in which it has been compressed and deformed into a form bounded by a substantially rectangular sectional configuration (See FIG. 6). Due to its resiliency, the sealing portion 70a of the modified O-ring 70 effects a sealing force between the connection end portions 51 and 61, primarily in the radial direction. Also, due to its resiliency, the pressurizing portion 70b of the modified O-ring 70 biases the throttle body 1 and the intake manifold 26 primarily in the detachment direction opposite to one another.

According to the intake device of this embodiment, the throttle body 1 and the intake manifold 26 are connected together in a detachment preventive state through engagement of the engagement protrusions 53 and the engagement members 62. Since the engagement protrusions 53 and the engagement members 62 are formed on the throttle body 1 and the intake manifold 26, there is no additional need to use any separate components, such as bolts or clamp members as has been necessary for a conventional connection between the throttle body and the intake manifold. The resulting connection structure is simplified, making it possible for an overall reduction in the size of the intake device for an internal combustion engine.

Additionally, due to the simplification of the connection structure, previous limitations inhibiting the mounting of the intake device to a vehicle engine are likely to be reduced or eliminated.

In an embodiment in which the throttle body 1 and the intake manifold 26 are both formed of resin and are connected together through engagement by the engagement device previously described and shown in FIGS. 1 through 9, it is also possible to reduce or mitigate the generation of unwanted distortion in either component. Comparatively, when separate components such as bolts or clamp members are used, the generation of unwanted distortion due to the application of surplus axial force to the connection area is to be expected.

Since this embodiment adopts a snap-fit type of engagement device, in which the engagement protrusions 53 and the engagement members 62 are engaged with each other, the throttle body 1 and the intake manifold 26 can be easily connected together by one-step operation without requiring additional tools or procedures.

Further, due to the resiliency of the seal member provided between the throttle body 1 and the intake manifold 26, in particular, the sealing portion 70a (See FIG. 7) of the modified O-ring 70 (See FIG. 6), it is possible to create a seal between the throttle body 1 and the intake manifold 26.

In addition, due to the resiliency of the pressurizing portion 70b (See FIG. 7) formed on the modified O-ring 70 (See FIG. 6), the throttle body 1 and intake manifold 26 are pressurized, that is, biased or under load, mainly in the detachment direction. Thus, it is possible to reduce or mitigate rattle in the various engagement regions where the two components potentially come into contact with each other.

Due to the reception of the connection end portion 61 of the intake manifold 26 by the reception groove 64 formed in the throttle body 1, the throttle body 1 and intake manifold 26 are connected together in a typical "spigot-joint relationship" (See FIG. 2). Therefore, it is possible to reduce or mitigate the transfer of a moment load upon the components 1 and 26 orthogonal to the intake passage axis, to the engagement portions where the engagement protrusions 53 and the engagement holes 63 are engaged with each other (See FIG. 6).

By respectively engaging the rotation preventive protrusions 67 and 68 (See FIG. 4) and the rotation preventive recesses 57 and 58 (See FIG. 5), the throttle body 1 and the intake manifold 26 are connected together in a state in which their rotation relative to each other is minimized. It is possible to reduce or mitigate the effects of the application of a moment load acting about the axis of the throttle body 1 and the intake manifold 26, from being transferred to the engagement portions (See FIG. 6) where the engagement protrusions 53 and the engagement holes 63 are engaged with each other.

[Second Embodiment]

A second embodiment of the present invention will be described with reference to FIGS. 10 through 12. The second embodiment consists of a partial modification of the first embodiment. Only the differences between the first and second embodiments will be described. Further, in FIGS. 10 through 12, the components that are identical to those of FIGS. 1 through 9 are indicated by the same reference numerals, and a description of such components will be omitted.

In the second embodiment, a first O-ring 81 (see FIG. 10) is used instead of the modified O-ring 70 (See FIG. 2) of the first embodiment. This first O-ring 81 is formed of resilient rubber and is of an ordinary configuration. Under a no-load condition, the first O-ring 81 exhibits a substantially circular sectional configuration. Due to its resiliency, the first O-ring 81 creates a seal between the throttle body 1 and the intake manifold 26, primarily in the radial direction.

Figure 10:
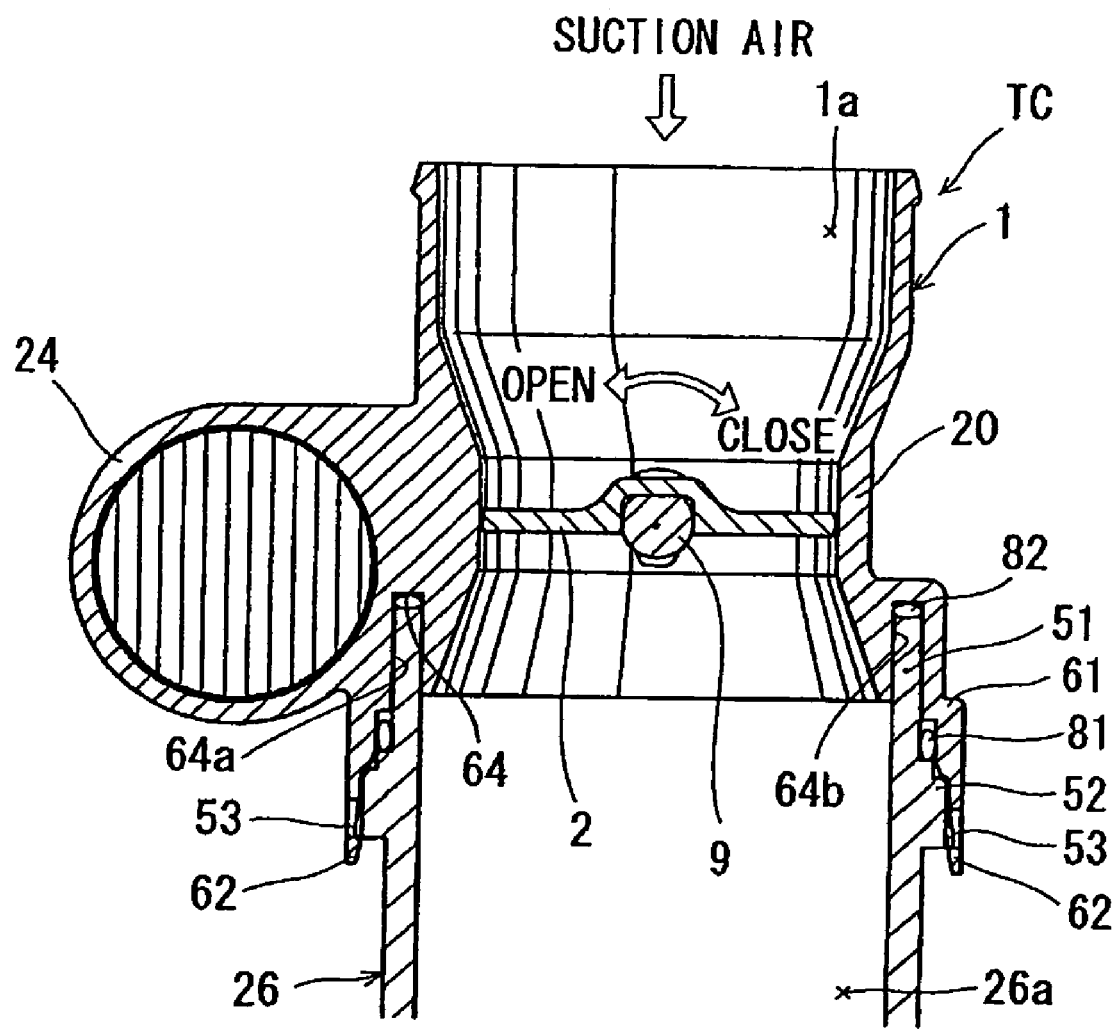
FIG. 10 is a longitudinal sectional view of a right-hand side portion of an intake device for an internal combustion engine according to a second embodiment of the present invention.

A second O-ring 82 is provided between the inner most depth end surface of the reception groove 64 of the throttle body 1 (top surface of groove in FIG. 10) and the forward end surface of the connection end portion 51 of the intake manifold 26 (top surface of 51 in FIG. 10). The second O-ring 82 is also made of resilient rubber and is of an ordinary configuration. In this embodiment the second O-ring 82 exhibits a substantially circular sectional configuration under no-load conditions. In the attached or connected state as shown in FIG. 10, the second O-ring 82 is compressed in the axial direction, and due to its resiliency, pressurizes, in other words, urges, the throttle body 1 and the intake manifold 26 primarily in the detachment direction apart from each other.

Figure 11:
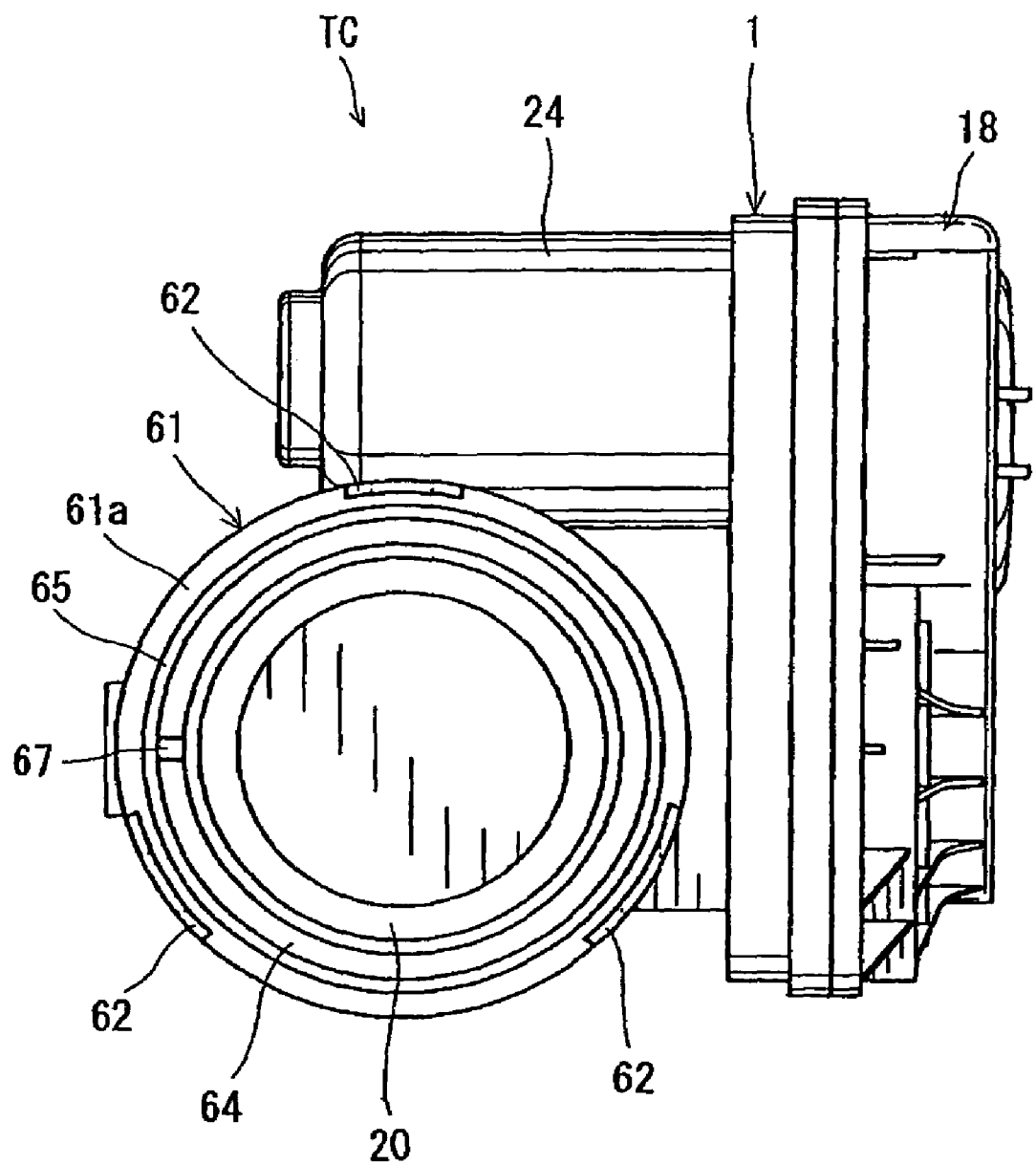
FIG. 11 is a bottom view of the intake device of FIG. 10.
Figure 12:
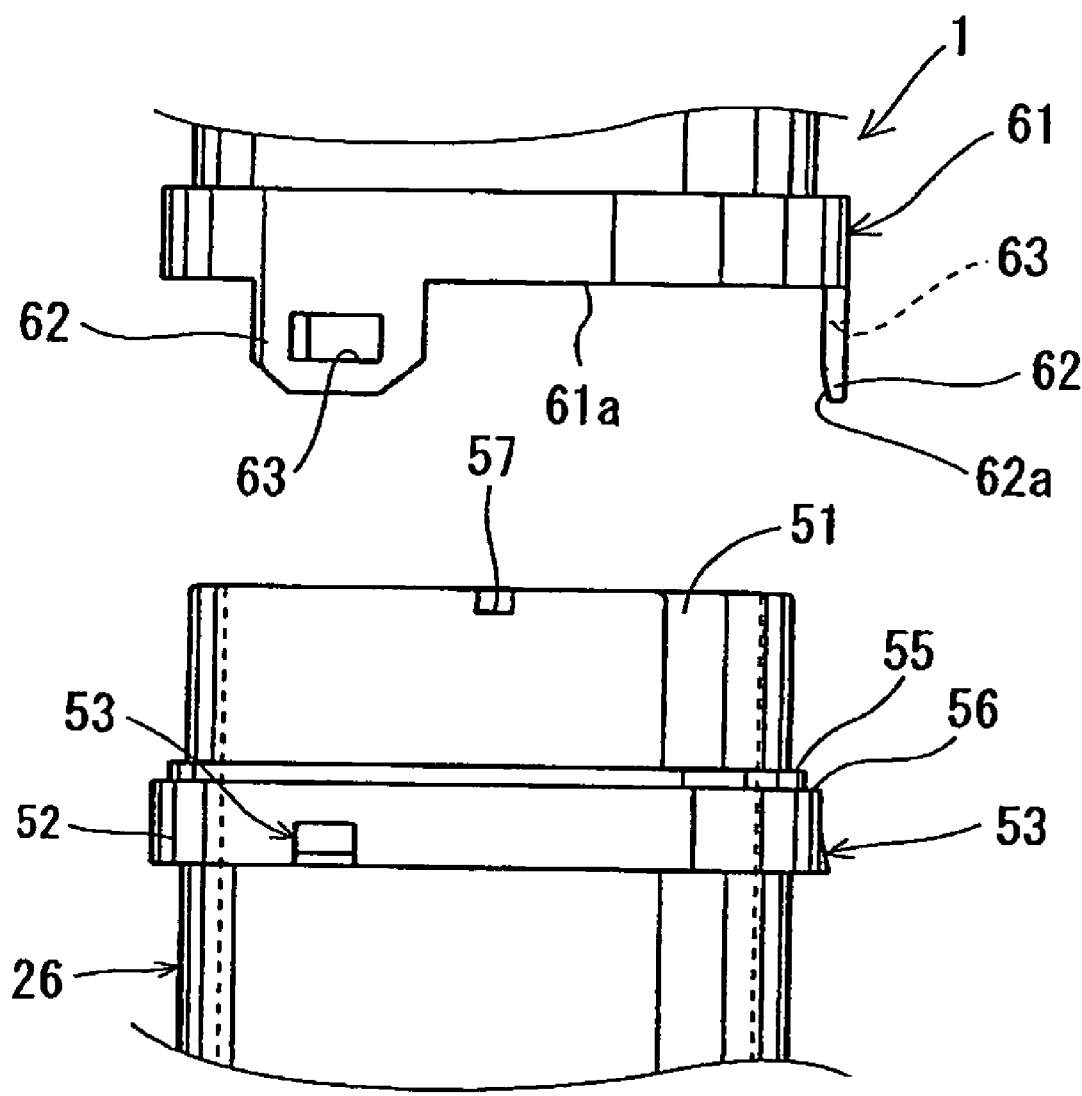
FIG. 12 is a left-hand side view of the connection structure for the throttle body of the intake device and the intake manifold.

As shown in FIG. 11, the second rotation preventive protrusion 68 of the first embodiment (See FIG. 4), provided in the connection end portion 61, is omitted. At the same time, the corresponding second rotation preventive recess (See FIG. 5), provided in the intake manifold 26 of the first embodiment, can be omitted as well (See FIG. 12). FIG. 12 is a side view of the intake manifold 26 as seen from the side of the first rotation preventive recess 57, the left-hand side corresponding to FIG. 11.

In the second embodiment described above, it is possible to achieve many of the same benefits as those of the first embodiment. Due to the resiliency of the first O-ring 81 provided between the throttle body 1 and the intake manifold 26, it is possible to effect a seal between those components, primarily in the radial direction (See FIG. 10). Further, due to the resiliency of the second O-ring 82 provided between the throttle body 1 and the intake manifold 26, the throttle body 1 and the intake manifold 26 are pressurized, that is, biased or subject to a load, primarily in the detachment direction apart from one another (See FIG. 10). The pressurizing makes it possible to reduce or mitigate rattle in the various engagement regions where the throttle body 1 is potentially in contact with the intake manifold 26. The pressurizing also helps to effect a seal between the components, primarily in the axial direction. By making it possible to adopt commercially available O-rings as the first O-ring 81 and the second O-ring 82, the second embodiment has advantages in the form of lower costs.

Figure 13:
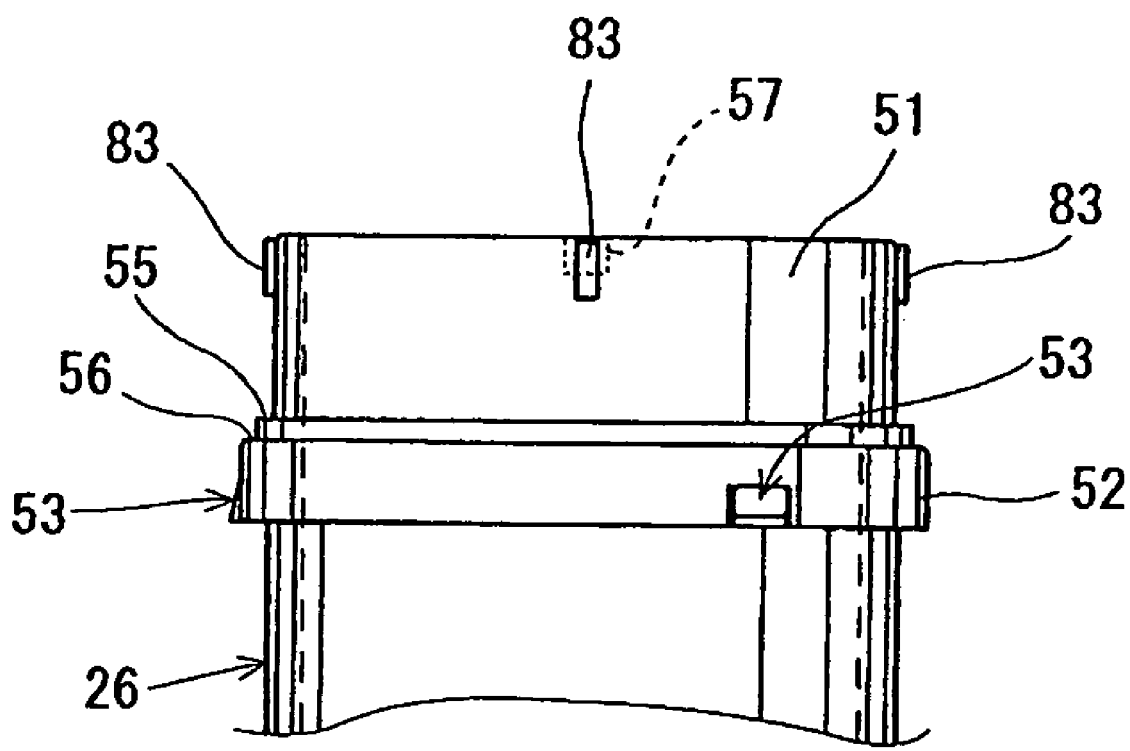
FIG. 13 is a right-hand side view of a modification of the connection structure for the intake manifold.
Figure 14:
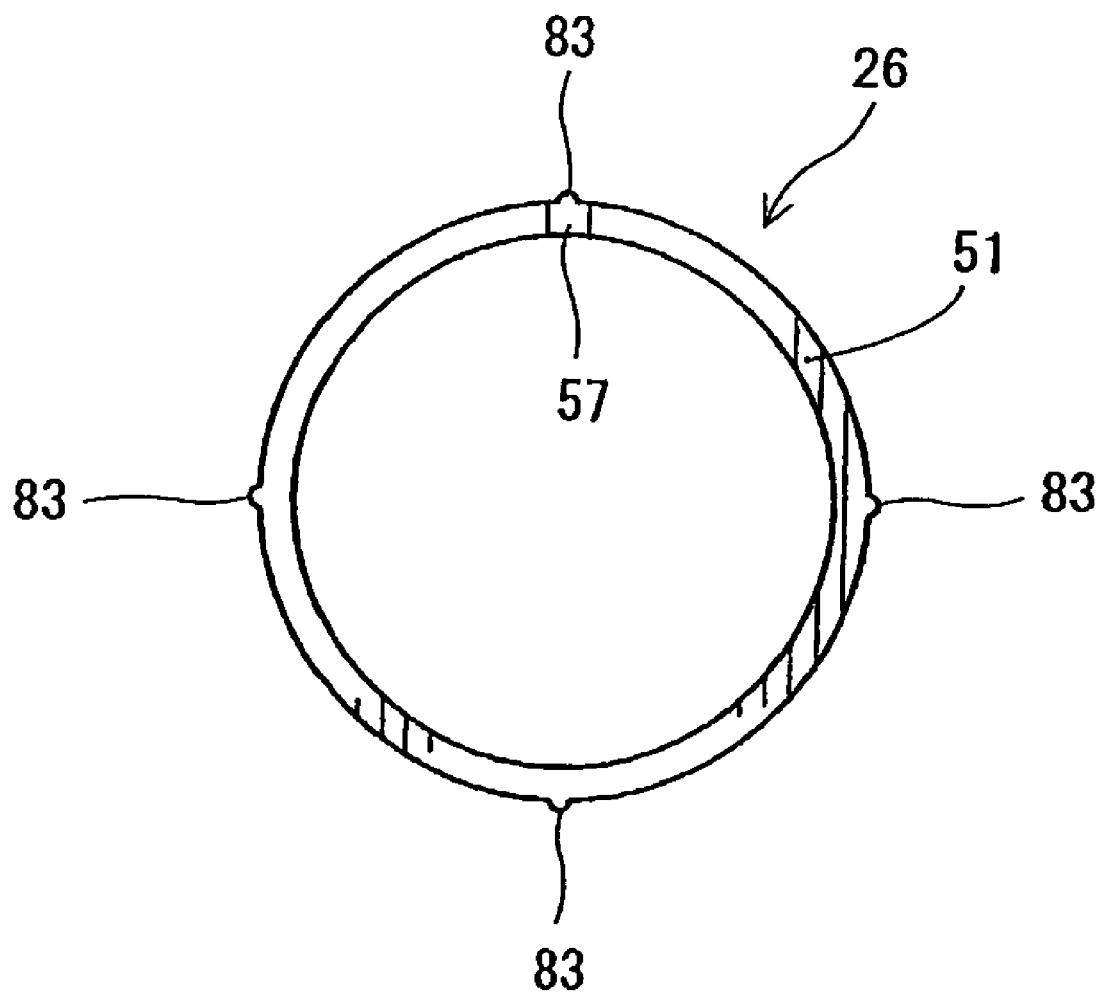
FIG. 14 is an end view, seen from above, of the connection structure of FIG. 13.
Figure 15:
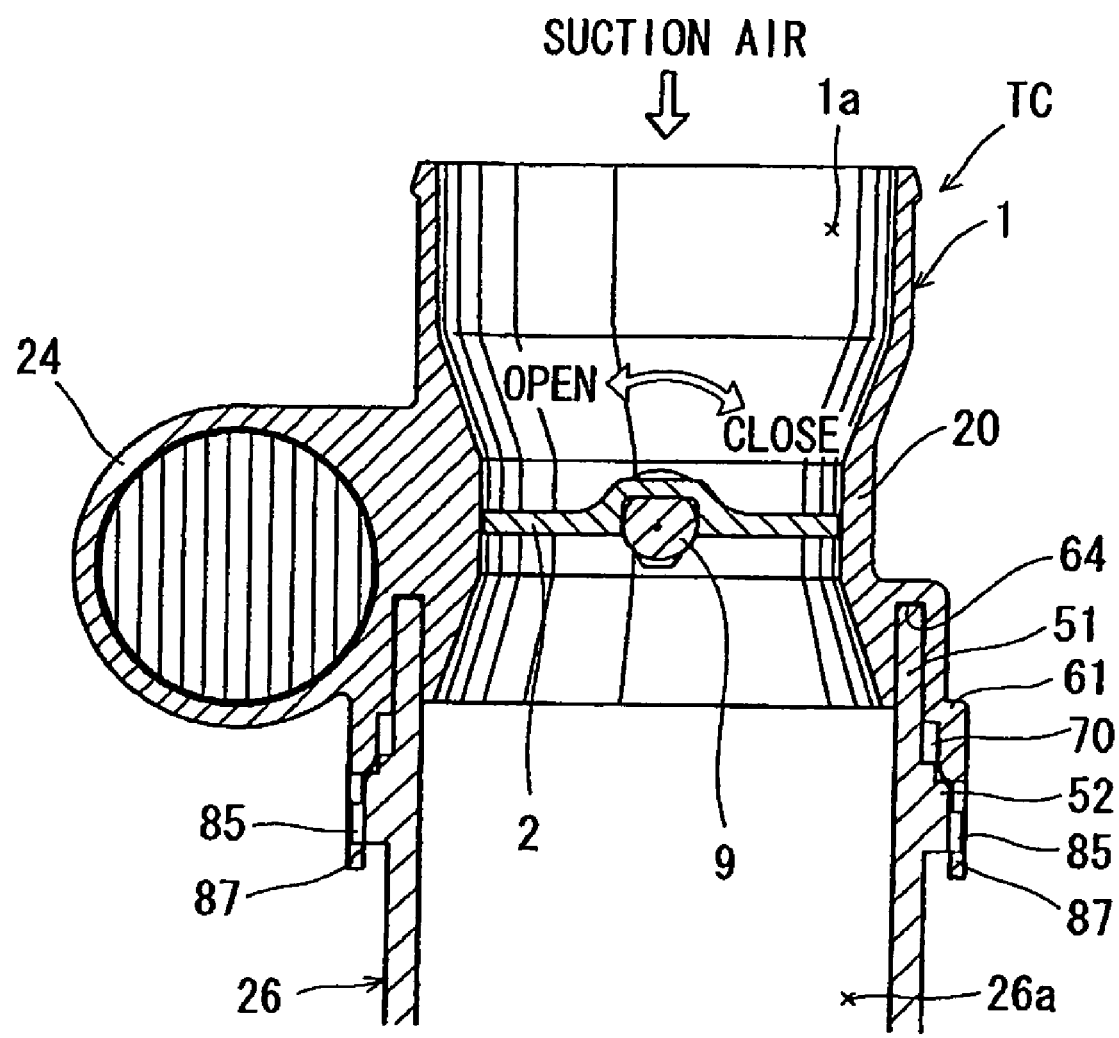
FIG. 15 is a longitudinal sectional view showing a right-hand side portion of an intake device for an internal combustion engine according to a third embodiment of the present invention.

As shown in FIGS. 13 and 14, in a variation of the second embodiment, it is possible to form an appropriate number of protrusions 83 (four are shown for example in FIG. 14) on the outer peripheral surface of the connection end portion 51 at regular circumferential intervals (See FIG. 14). FIG. 13 is a side view of the intake manifold 26 as seen from the side opposite to the first rotation preventive recess 57 (the right hand side as seen in FIG. 11). In this construction, the protrusions 83 (See FIGS. 13 and 14) are physically deformed and/or crushed by the groove reception wall surface 64a (See FIG. 10) of the reception groove 64 as the intake manifold 26 is inserted into the throttle body 1. This construction makes it possible to reduce or mitigate rattle between components 1 and 26.

In further variations to produce close-fit connections, the protrusions 83 may be provided on the inner peripheral surface of the connection end portion 51, or the protrusions 83 may be provided on the outer-periphery side groove wall surface 64a and/or the inner-periphery side groove wall surface 64b of the reception groove 64.

Aside from using the protrusions 83, a close-fit connection between the throttle body 1 and the intake manifold 26 can be realized by appropriately setting and controlling the tolerances of some diameter dimensions. The diameter of the outer peripheral surface and/or the inner peripheral surface of the intake manifold 26 and the diameter of the outer-periphery side groove wall surface 64a and/or the inner-periphery side groove wall surface 64b of the reception groove 64 of the throttle body 1 can be established so as to provide a press-fit connection of the intake manifold 26 into the throttle body 1.

[Third Embodiment]

A third embodiment of the present invention will be described with reference to FIGS. 15 through 18. The third embodiment consists of a partial modification of the first embodiment. Only the differences between the first and third embodiments will be described. Further, in FIGS. 15 through 18, the components that are identical to those of FIGS. 1 through 9 are indicated by the same reference numerals, and a description of such components will be omitted.

Figure 17:
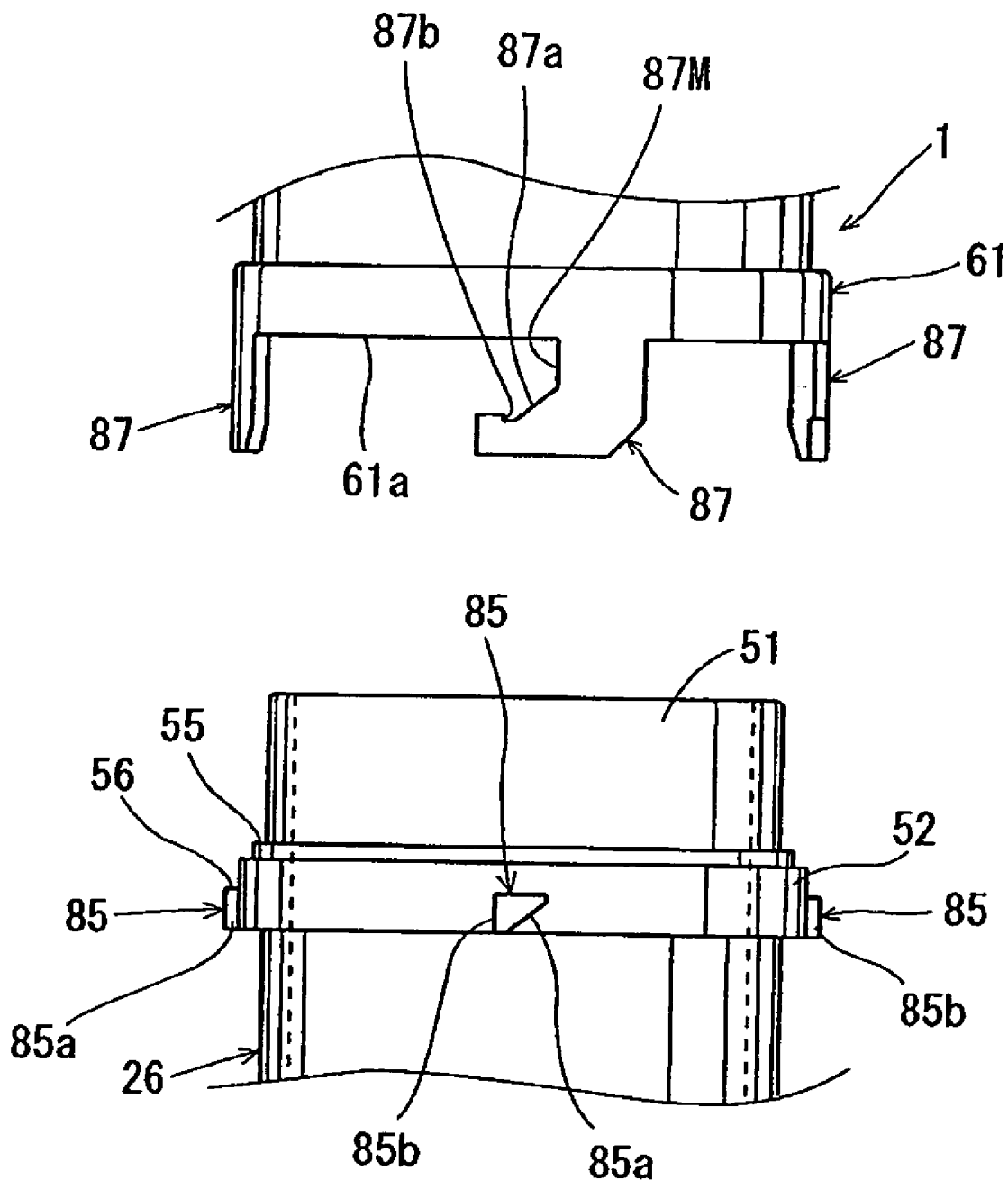
FIG. 17 is a right-hand side view of the connection structure for the throttle body of the intake device and the intake manifold.

Specifically, in the third embodiment, the engagement device of the first embodiment (protrusions 53 and members 62, see FIG. 5) is modified. As shown in FIG. 17, an appropriate number of engagement protrusions 85 are formed integrally on the outer peripheral surface of the enlarged portion 52 of the intake manifold 26 (in this example, four are used but only three can be seen in the view shown in FIG. 17). The engagement protrusions 85 are situated at regular circumferential intervals. Each engagement protrusion 85 is formed substantially as a right-triangular prism with a slope 85a and a lock surface 85b. The slope 85a is gradually inclined downwards from above to the left (as seen in FIG. 17). The lock surface 85b is substantially perpendicular to the outer peripheral surface of the enlarged portion 52, and extends in the axial direction (the vertical direction in FIG. 17).

As shown in FIG. 17, a plurality of engagement members 87 are formed on the forward end surface 61a of the connection end portion 61, and protrude below the forward end surface 61a. The engagement members 87 are capable of abutting or approaching the outer peripheral surface of the enlarged portion 52. Further, the number of engagement members 87 corresponds to the number of engagement protrusions 85 (four of each type), and the circumferential positions of the engagement members 87 correspond to the circumferential engagement positions of the engagement protrusions 85 (See FIG. 16). As shown in FIG. 17, the forward end portion of each engagement member 87 is directed to the left (as seen in FIG. 17) to exhibit a substantially J-shaped configuration. Each engagement member 87 has an engagement groove 87M. The engagement groove 87M has a slope 87a capable of coming into substantially direct contact with the slope 85a of the corresponding engagement protrusion 85, as well as a lock surface 87b capable of coming into substantially direct contact with the lower end portion of the lock surface 85b.

Figure 16:
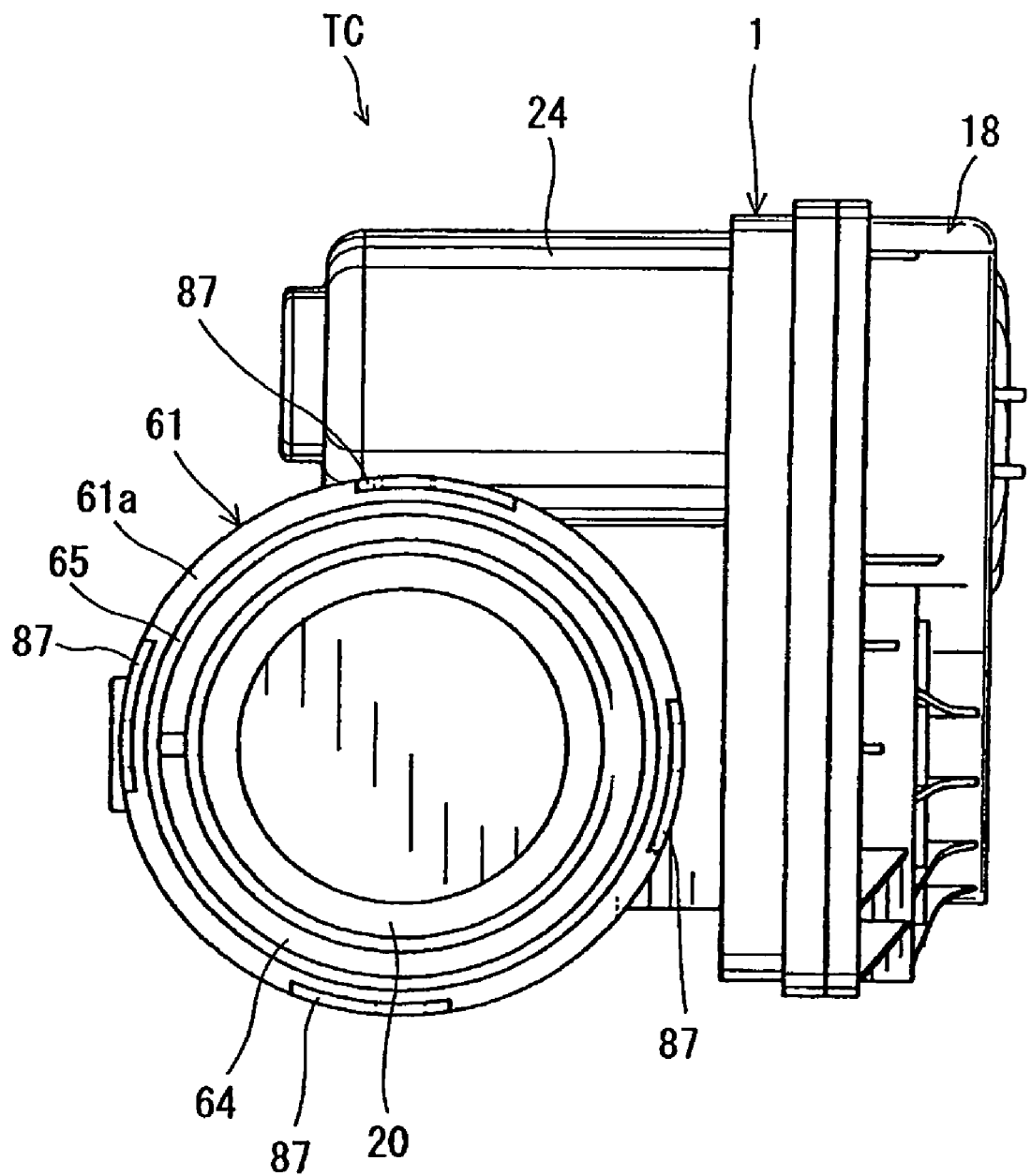
FIG. 16 is a bottom view of the intake device of FIG. 15.

As shown in FIG. 16, the rotation preventive protrusions 67 and 68 (See FIG. 4) provided in the connection end portion 61 of the first embodiment are omitted. At the same time, the rotation preventive recesses 57 and 58 (See FIG. 5) provided on the intake manifold 26 of the first embodiment can also be omitted (See FIG. 17).

The operation of connecting the throttle body 1 and the intake manifold 26 will be described next. This connecting operation is conducted by inserting the connection end portion 51 of the intake manifold 26 into the connection end portion 61 of the throttle body 1 from the state as shown in FIG. 17. At this time, approximately a half pitch with respect to the circumferential direction offsets the engagement protrusions 85 and the engagement members 87. The connection end portion 51 of the intake manifold 26 is then inserted into the throttle body 1, with the pressurizing portion 70b of the modified O-ring 70 undergoing resilient deformation (See the two-dot chain line in FIG. 18). With an axial load being applied such that the pressurizing portion 70b is compressed, the connection end portion 51 of the intake manifold 26 is rotated about the axis relative to the throttle body 1, whereby the engagement protrusions 85 enter the engagement grooves 87M of the engagement members 87. Thereafter, the axially applied inserting force is removed. Due to the resilient deformation of the pressurizing portion 70b of the modified O-ring 70, the throttle body 1 and the intake manifold 26 are pressurized in the detachment direction away from each other, and the engagement protrusions 85 are completely engaged with the engagement grooves 87M of the engagement members 87 (See the solid line 87 in FIG. 18). The slopes 87a of the engagement members 87 are brought into substantially direct contact with the slopes 85a of the engagement protrusions 85, and the lock surfaces 87b and 85b are brought into substantially direct contact with each other. At this point, the operation of connecting the throttle body 1 and the intake manifold 26 to each other is completed (See FIG. 15).

Figure 18:
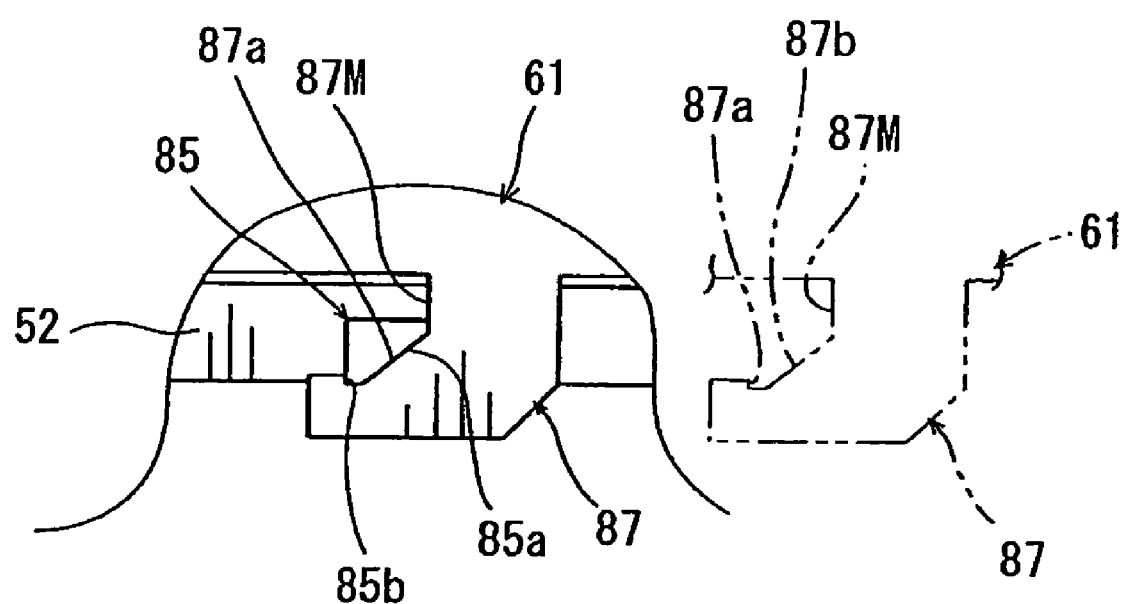
FIG. 18 is a side view of an engagement device.

Once connected, if a force in the axial, detachment direction is applied to the throttle body 1 and the intake manifold 26, detachment of the components 1 and 26 from each other is resisted with respect to the axial direction since the engagement protrusions 85 and the engagement members 87 transfer the axial force to components in substantially direct contact axially opposed to each other (Elements 85a & 85b opposed to 87a & 87b, See FIG. 18). Further, if a force in the direction about the axis is applied to the throttle body 1 and an opposing force is applied to the intake manifold 26, rotation about the axis of the components 1 and 26 relative to each other is resisted since the lock surfaces 85b and the lock surfaces 87b are in substantially direct contact circumferentially opposed to each other (See FIG. 18).

The third embodiment also provides many of the same benefits as those of the first embodiment. However, the engagement of the engagement protrusions 85 with the engagement members 87 is not realized by utilizing their ability for elastic deformation. Therefore, the throttle body 1 and the intake manifold 26 can be easily disassembled by simply performing an operation which is the reverse order of that used for assembly (See FIG. 17).

[Fourth Embodiment]

A fourth embodiment of the present invention will be described with reference to FIGS. 19 through 22. The fourth embodiment consists of a partial modification of the second embodiment. Only the differences between the second and fourth embodiments will be described. Further, in FIGS. 19 through 22, the components that are identical to those of FIGS. 10 through 12 are indicated by the same reference numerals, and a description of such components will be omitted.

Figure 19:
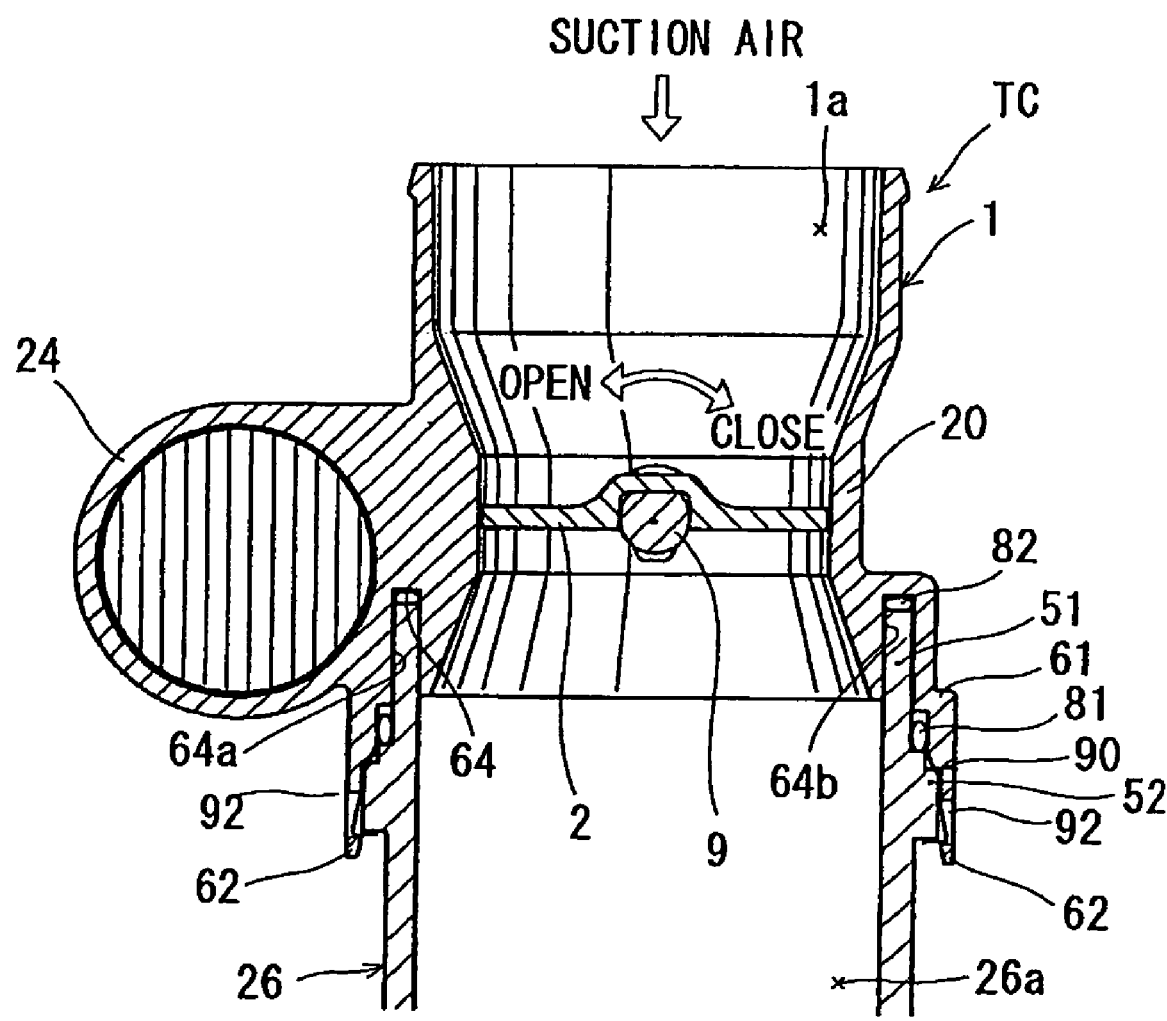
FIG. 19 is a longitudinal sectional view of a right-hand side portion of an intake device for an internal combustion engine according to a fourth embodiment of the present invention.
Figure 20:
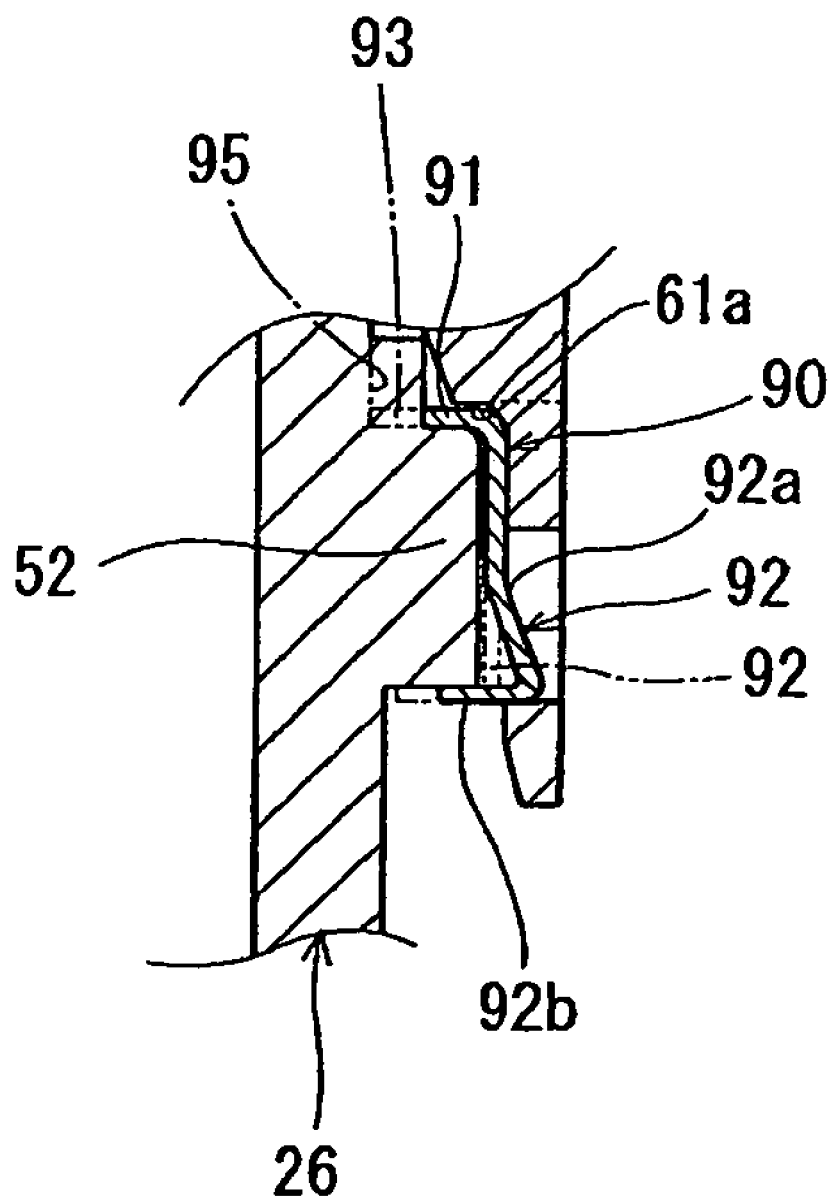
FIG. 20 is a sectional view of a snap-fit device of the intake device.
Figure 21:
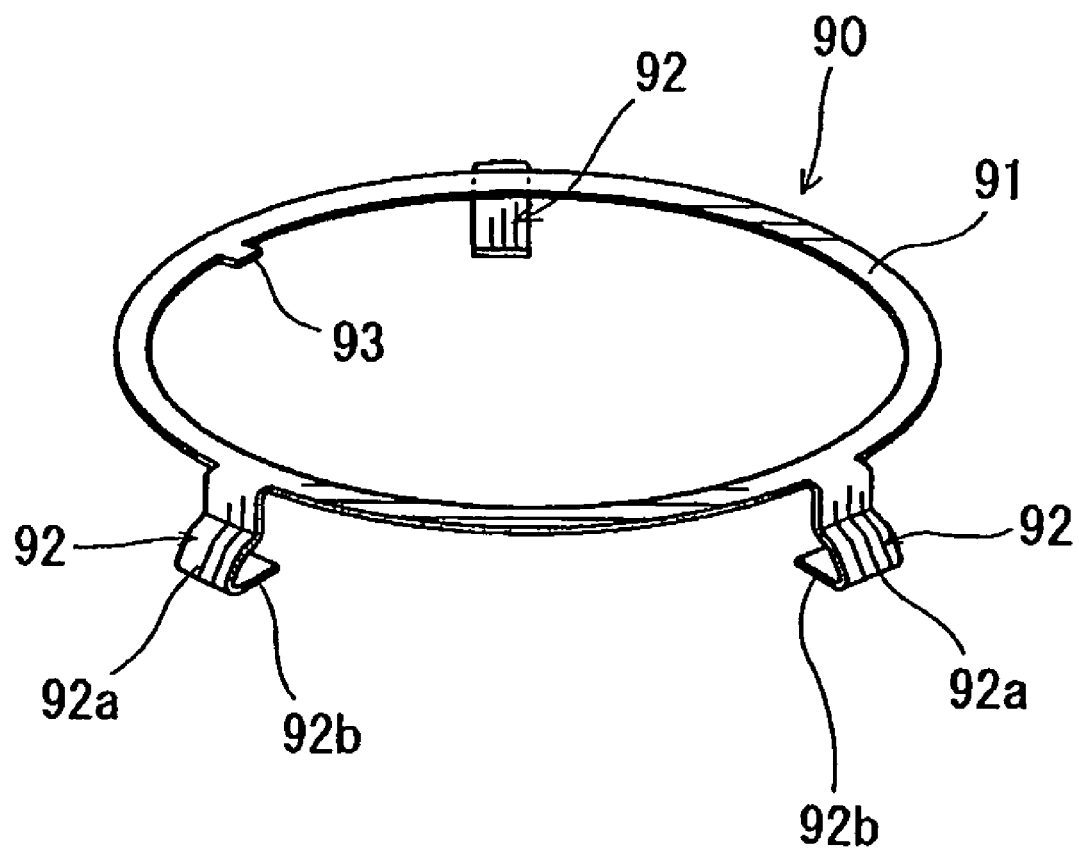
FIG. 21 is a perspective view of a snap member of the snap-fit device.

In the fourth embodiment, the engagement protrusions 53 (See FIG. 10) of the intake manifold 26 in the second embodiment are omitted. In their place, a ring-like snap member 90 consisting of a plate spring (as shown in FIG. 19) is attached to the intake manifold 26. As shown in FIG. 21, the snap member 90 has a substantially circular ring portion 91, a plurality of engagement protrusions 92, and at least one positioning protrusion 93. The engagement protrusions 92 protrude from the outer peripheral portion of the ring portion 91, and are bent into a substantially hook-like shape. Also, the engagement protrusions 92 are arranged at substantially regular circumferential intervals. The positioning protrusion 93 protrudes toward the center from the inner peripheral portion of the ring portion 91. Each engagement protrusion 92 has a guide slope 92a and a lock surface 92b that are similar to those of the engagement protrusion 53 (See FIG. 6) of the first embodiment (See FIG. 20). Further, as indicated by the two-dot chain line 92 in FIG. 20, the engagement protrusions 92 are capable of resilient deformation, in particular, deflective deformation.

Figure 22:
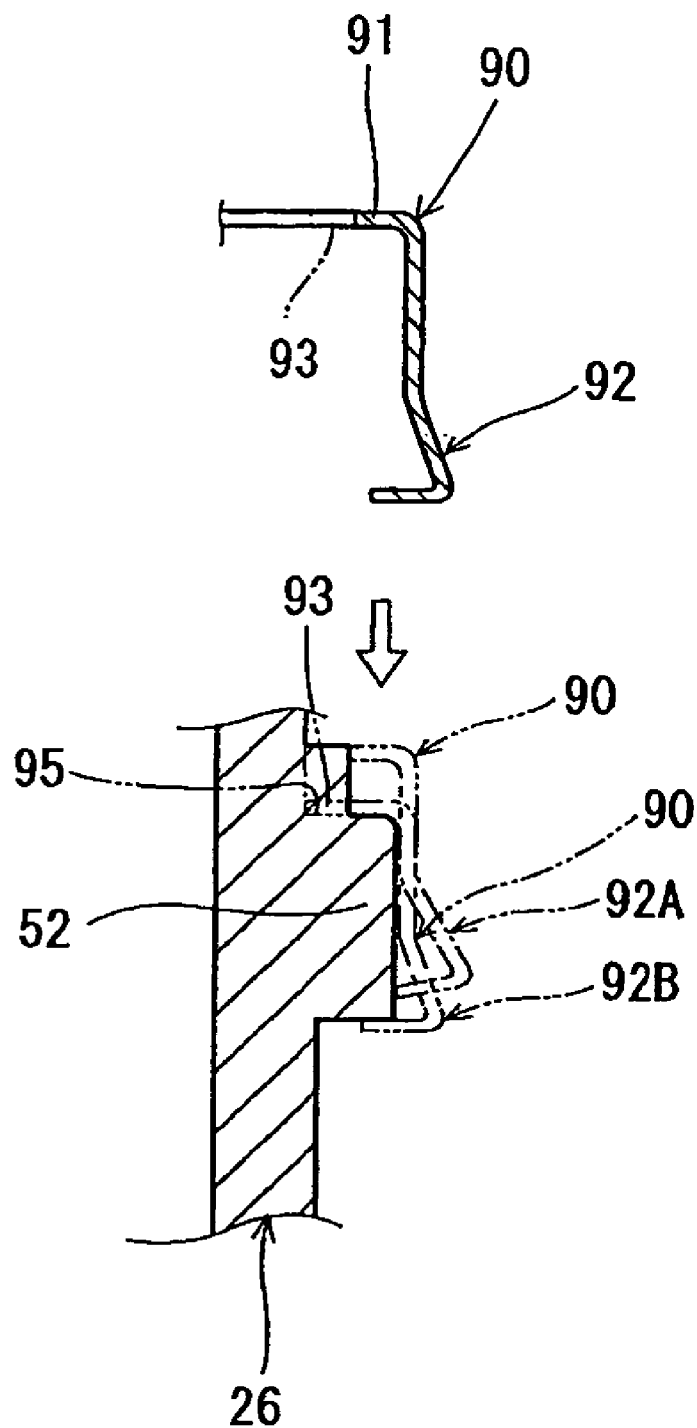
FIG. 22 is a sectional view showing a process for assembling the snap member.

The snap member 90 is fitted onto the connection end portion 51 of the intake manifold 26, and is attached to the enlarged portion 52 by utilizing the resilient deformation properties of the engagement protrusions 92 (See FIG. 19). During assembly, the snap member 90 is moved from the position indicated by the solid line in FIG. 22 so as to overlap the enlarged portion 52. Then the forward end portions (the lower end portions as seen in FIG. 22) of the engagement protrusions 92 are placed on the outer peripheral surface of the enlarged portion 52 while undergoing an outward elastic deformation (See the two-dot chain line 92A in FIG. 22). When the snap member 90 continues to move downward, the forward end portions of the engagement protrusions 92 slide along on the outer peripheral surface of the enlarged portion 52. The forward end portions of the engagement protrusions 92 eventually pass the lower outer peripheral surface of the enlarged portion 52. When this occurs, the engagement protrusions 92 are substantially elastically restored to their former state (See the two-dot chain line 92B in FIG. 22), The result is that the ring portion 91 of the snap member 90 and the forward end portions of the engagement protrusions 92 respectively come into substantially direct surface to surface contact with the upper and lower surfaces of the enlarged portion 52. In this way, the attachment of the snap member 90 to the intake manifold 26 is completed.

The enlarged portion 52 has a positioning recess 95 (See the two-dot chain line 95 in FIG. 22) that is capable of being engaged with the positioning protrusion 93 (See FIG. 21). Thus, in the state in which the above attachment has been completed, the positioning protrusion 93 is engaged with the positioning recess 95, orienting the engagement protrusions 92 to specific circumferential positions.

Subsequently, when the intake manifold 26, containing the snap member 90 attached as described above, is inserted into the throttle body 1, the guide slopes 62a abut the guide slopes 92a of the corresponding engagement protrusions 92, and then come into a sliding contact therewith. The engagement protrusions 92 of the snap member 90 then undergo inward deflective deformation (See the two-dot chain line 92 in FIG. 20). Since each engagement protrusion 92 is aligned in position with a corresponding engagement hole 63, after enough relative movement of the intake manifold 26 into the throttle body 1, each engagement protrusion 92 is resiliently restored outward to approximate its original state, and is thereby engaged with the corresponding engagement hole 63. In this way, the engagement protrusions 92 and the engagement holes 63 are engaged with each other and the operation of connecting the throttle body 1 to the intake manifold 26 is completed (See FIG. 19).

After the throttle body 1 and the intake manifold 26 have been connected together as described above, a force in the detachment axial direction applied to these components will cause the lock surface 92b to abut the corresponding surface of the engagement hole 63. Detachment of the throttle body 1 and the intake manifold 26 is thereby resisted with respect to the axial direction.

Moment loads applied about the axis are resisted by interaction between the engagement protrusions 92 and the engagement holes 63 transferring the loads to interaction between protrusion 93 and protrusion slot 95. Relative rotation of the throttle body 1 and the intake manifold 26 is thereby minimized.

Further, the engagement protrusions 92 and the engagement members 62 constitute a typical "snap-fit device", in which each engagement protrusion 92 undergoes a resilient deformation as the engagement protrusion 92 is engaged with the engagement hole 63.

The fourth embodiment also provides the many of the same benefits as those of the second embodiment. Due to the separate construction step in which the snap member 90 is attached to the intake manifold 26, it is possible to impart a desired resiliency to the engagement protrusions 92 irrespective of the material of the throttle body 1 and/or the intake manifold 26.

Figure 23:
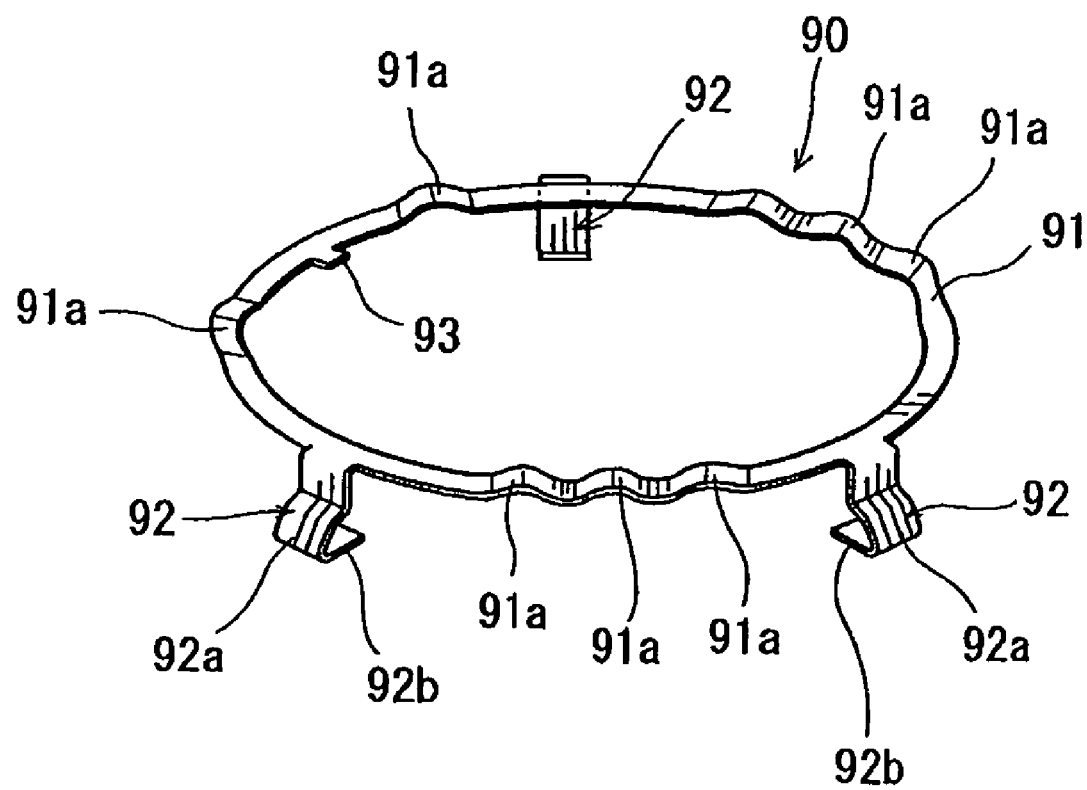
FIG. 23 is a perspective view of a modification of the snap member.

FIG. 23 shows a further modification of snap member 90. In this modification, the ring portion 91 of the snap member 90 has a plurality of pressurizing portions 91a. These pressurizing portions 91a exhibit a circumferentially corrugated configuration. These pressurizing portions 91a undergo elastic deformation as they abut the forward end surface 61a (See FIG. 20) of the connection end portion 61. Due to the resiliency of the pressurizing portions 91a of the snap member 90, it is possible to pressurize, i.e., urge, the throttle body 1 and the intake manifold 26 in the detachment axial direction. It is then possible to reduce or mitigate rattle in the portions where the intake manifold 26 and the throttle body potentially come in contact with each other. Further, with this modification, it is possible to omit the second O-ring 82 (See FIG. 19).

[Fifth Embodiment]

A fifth embodiment of the present invention will be described with reference to FIG. 24. The fifth embodiment consists of a partial modification of the second embodiment. Only the differences between the second and fifth embodiments will be described. Further, in FIG. 24, the components that are identical to those of FIGS. 10 through 12 are indicated by the same reference numerals, and a description of such components will be omitted.

Figure 24:
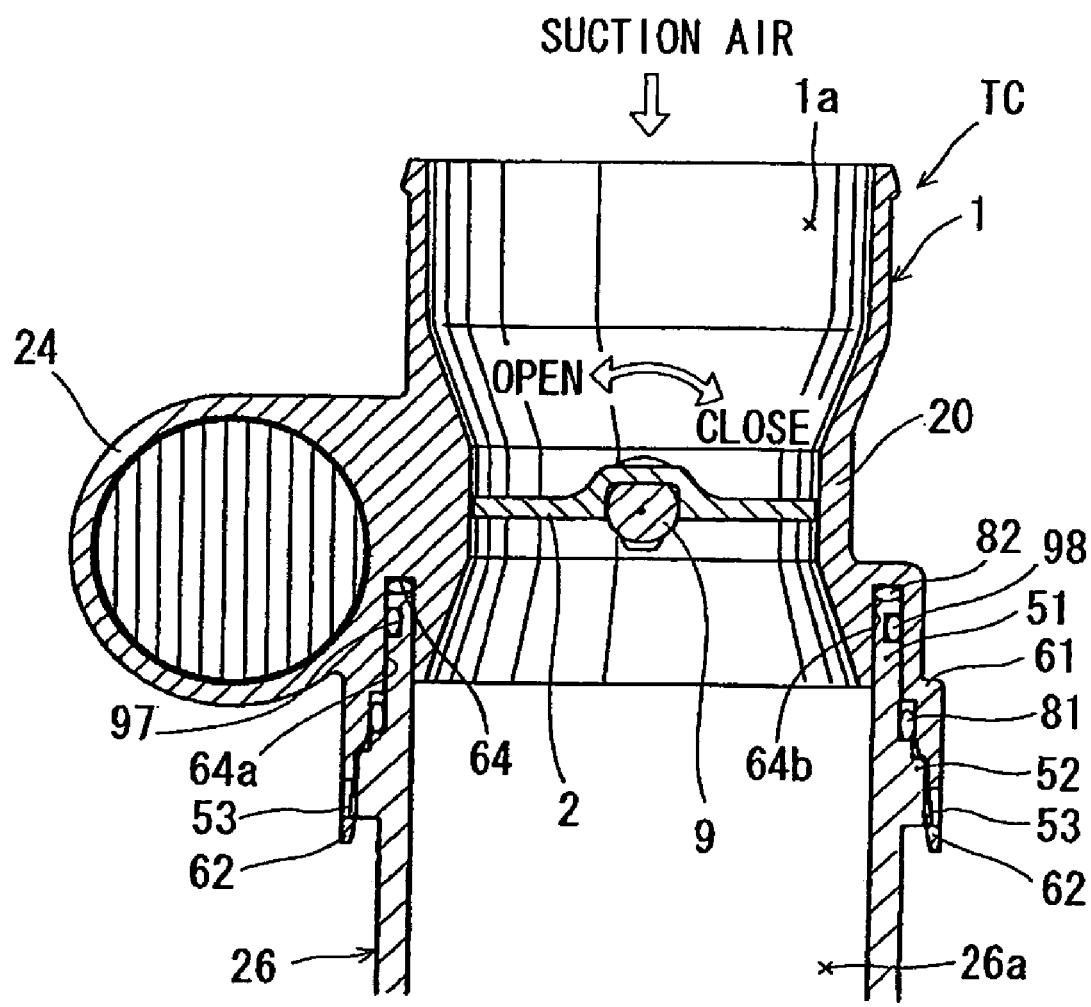
FIG. 24 is a longitudinal sectional view of a right-hand side portion of an intake device for an internal combustion engine according to a fifth embodiment of the present invention.

In the fifth embodiment as shown in FIG. 24, an annular groove 97 is formed in the outer peripheral portion of the connection end portion 51. A third O-ring 98 formed of resilient rubber is placed within the annular groove 97. Similar to the first O-ring 81 and the second O-ring 82, the third O-ring 98 is a standard, unmodified O-ring, which exhibits a substantially circular sectional configuration under no-load conditions. Due to the resiliency of the third O-ring 98, substantial sealing is created between the throttle body 1 and the intake manifold 26 primarily in the radial direction. However, an additional benefit is that rattle between components 1 and 26 is minimized.

The fifth embodiment also provides many of the same benefits of the second embodiment. In particular, due to the elasticity of the third O-ring 98, a seal primarily in the radial direction is substantially established between the throttle body 1 and the intake manifold 26 as well as a reduction or mitigation of rattle between these components. Further, due to the adoption of the third O-ring 98, it is possible to use looser tolerances and omit the close-fit structure of the throttle body 1 and the intake manifold 26, resulting in potential cost savings overall. The third O-ring 98 may also be provided on the inner peripheral side of the connection end portion 51 of the intake manifold 26. Alternatively, the third O-ring 98 may be provided on the inner peripheral side or the outer peripheral side of the reception groove 64 of the throttle body 1.

The present invention is not restricted to the first through fifth embodiments or their modifications described above. Numerous modifications and variations of the embodiments are possible without departing from the scope of the present invention. For example, the present invention is applicable not only to the connection between the throttle body 1 and the intake manifold 26 on the downstream side of the throttle body 1 but also to the connection between the throttle body 1 and a pipe member on the upstream side of the throttle body 1. Further, while it is desirable for the throttle body 1 and the intake manifold 26 to be formed of resin, this should not be construed restrictively. It is also possible to form the engagement protrusions of the engagement device on the throttle body 1 and to form the engagement recesses in the intake manifold 26, or to even have some of each type on both the throttle body 1 and the intake manifold 26. Further, it is also possible to impart resiliency to both the engagement protrusions and the engagement recesses, or either one alone. Additionally, the snap member 90 may be formed so as to impart resilience to the engagement members, or even attached to the throttle body 1. These are just some of the numerous variations and should not be taken for an exhaustive list.

What is claimed is:

1. An intake device for an internal combustion engine comprising:

a throttle body forming an intake passage;

a throttle valve arranged within the intake passage;

a pipe member connected to the throttle body, wherein the pipe member forms a communication passage communicating with the intake passage;

an engagement device provided between the throttle body and the pipe member, wherein the engaging device includes at least one engagement protrusion and at least one engagement recess, so that detachment of the throttle body and the pipe member from each other is resisted when the engagement protrusion and the engagement recess are engaged with each other, wherein the throttle body and the pipe member respectively have a first connection end portion and a second connection end portion, and the first and second connection end portions are fitted with each other in the axial direction; and at least one resilient seal member for radially effecting sealing between the first connection end portion and the second connection end portion, wherein the resilient seal member is a modified ring having a seal portion and a pressurizing portion formed integrally with each other; wherein the seal portion serves to effect sealing in the radial direction and the pressurizing portion serves to urge the throttle body and the pipe member in disconnecting axial directions relative to each other.

2. An intake device for an internal combustion engine comprising:
- a throttle body forming an intake passage;
- a throttle valve arranged within the intake passage;
- a pipe member connected to the throttle body, wherein the pipe member forms a communication passage communicating with the intake passage;
- wherein the throttle body and the pipe member respectively have a first connection end portion and a second connection end portion, and the first and second connection end portions are fitted with each other the axial direction; and
- wherein one of the first connection end portion and the second connection end portion has a first engagement device comprising a reception groove capable of receiving the other of the first connection end portion and the second connection end portion,
- and a second engagement device is provided between the throttle body and the pipe member, wherein the second engagement device includes at least one engagement protrusion and at least one engagement recess, so that detachment of the throttle body and the pipe member from each other is resisted when the engagement protrusion and the engagement recess are engaged with each other.

3. An intake device for an internal combustion engine comprising:
- a throttle body forming an intake passage;
- a throttle valve arranged within the intake passage;
- a pipe member connected to the throttle body, wherein the pipe member forms a communication passage communicating with the intake passage;
- wherein the throttle body and the pipe member respectively have a first connection end portion and a second connection end portion, and the first and second connection end portions are fitted with each other in the axial direction; and
- a modified ring having a first portion and a second portion formed integrally with each other; wherein the first portion of the modified ring serves to effect sealing in the radial direction between the first connecting end portion and the second connecting end portion, and the second portion of the modified ring is axially resiliently compressed between the first connecting end portion and the second connecting end portion when the first connecting end portion and the second connecting portions are fitted with each other.

4. An intake device for an internal combustion engine comprising:
- a throttle body forming an intake passage;
- a throttle valve arranged within the intake passage;
- a pipe member connected to the throttle body, wherein the pipe member forms a communication passage communicating with the intake passage;
- wherein the throttle body and the pipe member respectively have a first connection end portion and a second connection end portion, and the first and second connection end portions are fitted with each other in the axial direction; and
- one of the first connection end portion and the second connection end portion has a reception groove capable of receiving the other of the first connection end portion and the second connection end portion; wherein the reception groove includes a first wall and a second wall opposing to each other in the radial direction.

5. The intake device as in claim 4, wherein the reception groove has a bottom in the axial direction, and wherein the intake device further comprises a resilient member interposed between the bottom of the reception groove and the other of the first connection end portion and the second connection end portion, so that the resilient member is axially compressed when the first and second connection end portions are fitted with each other.

6. The intake device as in claim 5 wherein the reception groove further includes a first wall and a second wall opposing to each other in the radial direction and defining a radial clearance therebetween, and wherein the other of the first connection end and the second connection end has a thickness in the radial direction that is substantially equal to the radial clearance between the first wall and the second wall of the reception groove.

7. The intake device as in claim 4, further comprising a seal member effecting sealing in the radial direction between the first connecting end portion and the second connecting end portion, and
- wherein the one of the first connection end portion and the second connection end portion has a base defining the reception groove and an extension extending axially from the base;
- wherein the reception groove includes a first wall and a second wall opposing to each other in the radial direction;
- wherein the second wall is positioned radially outward of the first wall;
- wherein the extension has a radially inner surface formed in series with the second wall of the reception groove via a stepped portion, so that the radially inner surface of the extension is positioned radially outward of the second wall of the reception groove; and
- wherein the seal member is positioned between the radially inner surface of the extension and a part of the other of the first connection end portion and the second connection end portion opposing to the radially inner surface of the extension.

8. The intake device as in claim 4, further comprising a seal member effecting sealing in the radial direction between the first connecting end portion and the second connecting end portion, and
- wherein the one of the first connection end portion and the second connection end portion has a base defining the reception groove and an extension extending axially from the base;
- wherein the extension has a radial thickness gradually decreasing in the axial direction away from the base.

* * * * *